United States Patent
Sakaguchi et al.

(10) Patent No.: US 11,005,125 B2
(45) Date of Patent: May 11, 2021

(54) NONAQUEOUS ELECTROLYTE SOLUTION FOR SECONDARY BATTERIES AND SECONDARY BATTERY PROVIDED WITH SAME

(71) Applicant: STELLA CHEMIFA CORPORATION, Osaka (JP)

(72) Inventors: Toshitaka Sakaguchi, Osaka (JP); Sojiro Kon, Osaka (JP); Yoshifumi Katsura, Osaka (JP); Tetsuo Nishida, Osaka (JP)

(73) Assignee: STELLA CHEMIFA CORPORATION, Osaka (JP)

( * ) Notice: Subject to any disclaimer, the term of this patent is extended or adjusted under 35 U.S.C. 154(b) by 71 days.

(21) Appl. No.: 15/548,639

(22) PCT Filed: Jan. 21, 2016

(86) PCT No.: PCT/JP2016/051687
§ 371 (c)(1),
(2) Date: Aug. 3, 2017

(87) PCT Pub. No.: WO2016/125592
PCT Pub. Date: Aug. 11, 2016

(65) Prior Publication Data
US 2018/0019498 A1  Jan. 18, 2018

(30) Foreign Application Priority Data
Feb. 4, 2015 (JP) .............................. JP2015-020733

(51) Int. Cl.
*H01M 10/0567* (2010.01)
*H01M 10/052* (2010.01)
(Continued)

(52) U.S. Cl.
CPC .......... *H01M 10/0567* (2013.01); *C07F 9/09* (2013.01); *H01M 10/052* (2013.01);
(Continued)

(58) Field of Classification Search
CPC ... C07F 9/09; H01M 10/052; H01M 10/0525; H01M 10/0567; H01M 10/0568;
(Continued)

(56) References Cited

U.S. PATENT DOCUMENTS

| | | |
|---|---|---|
| 2013/0236776 A1 | 9/2013 | Egorov et al. |
| 2014/0272605 A1 | 9/2014 | Lim et al. |
| 2017/0054178 A1 | 2/2017 | Sakaguchi et al. |

FOREIGN PATENT DOCUMENTS

| | | |
|---|---|---|
| CN | 102832409 A | 12/2012 |
| EP | 3168917 A1 | 5/2017 |

(Continued)

OTHER PUBLICATIONS

Machine Translation JP2014022332A (Year: 2014).*
Scientific and Technical Information Center (STIC) results by Julia Wang (Year: 2018).*
Machine Translation JPWO2013002186 (Year: 2013).*
(Continued)

*Primary Examiner* — Victoria H Lynch
(74) *Attorney, Agent, or Firm* — Knobbe, Martens, Olson & Bear LLP

(57) ABSTRACT

A nonaqueous electrolytic solution for a secondary battery exhibits excellent cycle characteristics even in high-temperature environments. The solution includes at least one of boric acid esters, acid anhydrides, cyclic carbonates having an unsaturated bond, cyclic carbonates having a halogen atom, cyclic sulfonic acid esters, and amines having an acetoacetyl group. A secondary battery having a positive electrode and a negative electrode makes use of this electrolytic solution.

10 Claims, 1 Drawing Sheet

(51) Int. Cl.
  *C07F 9/09* (2006.01)
  *H01M 10/0525* (2010.01)
  *H01M 10/0568* (2010.01)
  *H01M 10/0569* (2010.01)
  *H01M 10/42* (2006.01)

(52) U.S. Cl.
  CPC ... *H01M 10/0525* (2013.01); *H01M 10/0568* (2013.01); *H01M 10/0569* (2013.01); *H01M 10/4235* (2013.01); *H01M 2300/0037* (2013.01)

(58) Field of Classification Search
  CPC ......... H01M 10/0569; H01M 10/4235; H01M 2300/0037
  See application file for complete search history.

(56) References Cited

FOREIGN PATENT DOCUMENTS

| | | | |
|---|---|---|---|
| JP | H08-138733 | A | 5/1996 |
| JP | H11-67270 | A | 3/1999 |
| JP | 2000-123867 | A | 4/2000 |
| JP | 2000-516930 | A | 12/2000 |
| JP | 2001-126762 | | 5/2001 |
| JP | 2001-126762 | A | 5/2001 |
| JP | 3294446 | B2 | 6/2002 |
| JP | 2002-193973 | A | 7/2002 |
| JP | 2003-132946 | | 5/2003 |
| JP | 2003-132946 | A | 5/2003 |
| JP | 2004-031079 | A | 1/2004 |
| JP | 2010-045341 | A | 2/2010 |
| JP | 2012-001459 | A | 1/2012 |
| JP | 2013-125625 | A | 6/2013 |
| JP | 2014-022332 | | 2/2014 |
| JP | 2014-022332 | A | 2/2014 |
| JP | 2014022332 | A * | 2/2014 .......... H01M 10/052 |
| JP | 2014-022333 | A | 3/2014 |
| JP | 2015-011991 | A | 1/2015 |
| JP | 2015-090785 | A | 5/2015 |
| WO | 2006/008921 | A1 | 1/2006 |
| WO | 2013/002186 | A1 | 1/2013 |
| WO | WO 2013/002186 | A1 | 1/2013 |
| WO | 2015/122512 | A1 | 8/2015 |
| WO | 2016/006607 | A1 | 1/2016 |
| WO | 2016/125593 | A1 | 8/2016 |
| WO | 2016/129351 | A1 | 8/2016 |

OTHER PUBLICATIONS

Office Action received in European Patent Application No. EP 16 746 423.9, dated Mar. 14, 2019.
International Search Report dated Apr. 12, 2016 for International Application No. PCT/JP2016/051687.
Written Opinion dated Apr. 12, 2016 for International Application No. PCT/JP2016/051687.
International Search Report dated Mar. 10, 2015 for International Application No. PCT/JP2015/054057.
Written Opinion dated Mar. 10, 2015 for International Application No. PCT/JP2015/054057.
International Search Report dated Apr. 12, 2016 for International Application No. PCT/JP2016/051688.
Written Opinion dated Apr. 12, 2016 for International Application No. PCT/JP2016/051688.
International Search Report dated Apr. 12, 2016 for International Application No. PCT/JP2016/051686.
Written Opinion dated Apr. 12, 2016 for International Application No. PCT/JP2016/051686.
Extended European Search Report received in PCT Application No. PCT/JP2016051687 dated Mar. 19, 2018.
Supplemental Partial European Search Report received in PCT Application No. PCT/JP2016051687 dated Jan. 11, 2018.
Kang Xu: "Nonaqueous Liquid Electrolytes for Lithium-Based Rechargeable Batteries", Chemical Reviews, 2004, vol. 104, No. 10, pp. 4303-4417, (submitted in two parts).
Kaymaksiz Serife et al .: "Electrochemical stability of lithium salicylato-borates as electrolyte additives in Li-ion batteries", Journal of Power Sources 239 (2013) pp. 659-669.
Xue Z M et al .: "LBDOB, a new lithium salt with benzenediolato and oxalato complexes of boron for lithium battery electrolytes", Journal of Power Sources 195 (2010) pp. 853-856.
Office Action received in European Patent Application No. EP 16 746 423.9, dated Oct. 17, 2019.
Office Action dated Apr. 21, 2020, related to Japanese Patent Application No. 2016-9377.
European office action Communication pursuant to Article 94(3) EPC received in EP16 746 423.9 dated Mar. 23, 2020.
Office Action received in Chinese Patent Application No. 201680008847.1 dated Oct. 11, 2019.
Office Action issued in the corresponding CN application No. 201680008847.1., dated Jul. 3, 2020.
Office Action dated Feb. 7, 2021, for the corresponding Chinese Application No. 201680008847.1.

\* cited by examiner

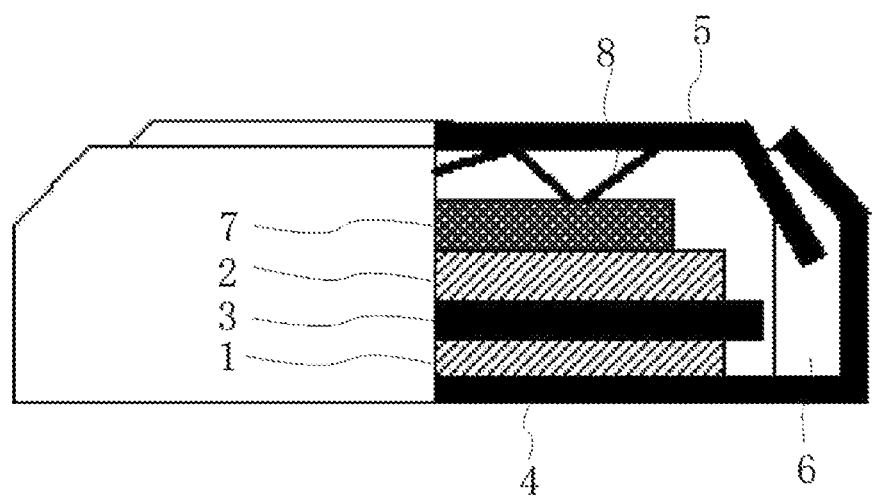

NONAQUEOUS ELECTROLYTE SOLUTION FOR SECONDARY BATTERIES AND SECONDARY BATTERY PROVIDED WITH SAME

INCORPORATION BY REFERENCE TO ANY PRIORITY APPLICATIONS

This application is the U.S. National Phase of International Application No. PCT/JP2016/051687, filed Jan. 21, 2016, designating the U.S. and claiming priority to Japanese Application No. 2015-020733, filed Feb. 4, 2015. Any and all applications for which a foreign or domestic priority claim is identified here or in the Application Data Sheet as filed with the present application are hereby incorporated by reference under 37 CFR 1.57.

TECHNICAL FIELD

The present invention relates to a nonaqueous electrolytic solution for a secondary battery which exhibits excellent cycle characteristics even in high-temperature environments, and a secondary battery including the nonaqueous electrolytic solution.

BACKGROUND ART

In recent years, the applied field secondary battery including a lithium secondary battery is pursued further high performance, such as improvements of a power density and energy density and a reduction of a capacity loss, in association with an increase in uses from electronic devices such as mobile phones, personal computers and digital cameras to vehicle installation. For in-vehicle usage, durability that is higher than before is desired against an ambient operating temperatures which are both of high temperatures and low temperatures. Particularly, regarding high-temperature environments, when a cell is increased in size, since the cell is constantly exposed to a relatively high temperature due to not only the usage environment but also self-generated heat, an improvement of high-temperature durability is very important. Furthermore, when the cell is stored in the high-temperature environments, an internal resistance of the cell is increased in association with deterioration of an electrode, an electrolytic solution or an electrolyte, and energy loss resulting from an internal resistance in low-temperature environments becomes remarkable.

In conventional common lithium secondary batteries, materials in which Li ions can be reversibly inserted are used for a positive electrode active material and a negative electrode active material. For examples, a compound such as $LiNiO_2$, $LiCoO_2$, $LiMn_2O_4$ or $LiFePO_4$ is used for the positive electrode active material. Lithium metal, an alloy thereof, a carbon material, a graphite material or the like is used for the negative electrode active material. Furthermore, an electrolytic solution formed by dissolving an electrolyte such as $LiPF_6$ or $LiBF_4$ in a mixed solvent such as ethylene carbonate, diethyl carbonate and propylene carbonate is used for an electrolytic solution to be used for the lithium secondary battery.

Generally, there is understanding that a stable coating (solid electrolyte interface) having lithium ion conductivity but not having electronic conductivity is formed at an interface between the electrode active material and the electrolytic solution. The process of insertion in an electrode active material/desertion from an electrode active material of lithium ions is high in reversibility; however, when charge-discharge is repeated in the high-temperature environments, cracks are produced or dissolution/decomposition takes place at the stable interface and therefore charge-discharge characteristics tend to be lowered or impedance tends to increase.

Numerous attempts to improve deterioration of a capacity of a secondary battery due to repeated charge-discharge in environments of a temperature load are reported for such problems. Patent Document 1 proposes to add vinylene carbonate, and in this proposal, an improvement of cycle characteristics at room temperature is found; however, the cycle characteristics are lowered in high-temperature environments.

Further, Patent Document 2 discloses that by using a nonaqueous electrolytic solution containing a monofluorophosphate or a difluorophosphate as an additive, a coating can be formed on a positive electrode and a negative electrode of a lithium secondary battery, and thereby, decomposition of the electrolytic solution resulting from the contact between the nonaqueous electrolytic solution and a positive electrode active material/a negative electrode active material is suppressed to enable to inhibit self-discharge, to improve storage performance, and to improve a power characteristic; however, it is required to further improve cycle characteristics in the case of storing in high-temperature environments.

PRIOR ART DOCUMENT

Patent Documents

Patent Document 1: JP-A-2000-123867
Patent Document 2: JP-A-2004-31079

SUMMARY

The present invention has been made in view of the aforementioned problem, and it is an object of the present invention to provide a nonaqueous electrolytic solution for a secondary battery which exhibits excellent cycle characteristics even in high-temperature environments; and a secondary battery including the nonaqueous electrolytic solution.

In order to solve the above-mentioned problems, the nonaqueous electrolytic solution for a secondary battery which is used for a secondary battery, comprising:

the following component (A) and the following component (B), component (A): at least one compound represented by the following general formula (1); and component (B): one boron complex salt represented by the following general formula (2), or at least one type of compound selected from the group consisting of boric acid esters, acid anhydrides, cyclic carbonates having an unsaturated bond, cyclic carbonates having a halogen atom, cyclic sulfonic acid esters, and amines represented by the general formula (3) and having an acetoacetyl group:

[Chemical Formula 1]

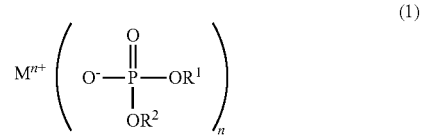

(1)

in which the $M^{n+}$ represents an alkali metal ion, an alkaline earth metal ion, an aluminum ion, a transition metal ion or an onium ion, the $R^1$ and $R^2$ each independently represent any of a hydrocarbon group having 1 to 20 carbon atoms and a hydrocarbon group having 1 to 20 carbon atoms and having at least any one of a halogen atom, a heteroatom and an unsaturated bond, or the $R^1$ and $R^2$ represent any of a hydrocarbon group having 1 to 20 carbon atoms and a hydrocarbon group having 1 to 20 carbon atoms and having at least any one of a halogen atom, a heteroatom and an unsaturated bond, and are coupled to each other to form a cyclic structure, and the n represents a valence,

[Chemical Formula 2]

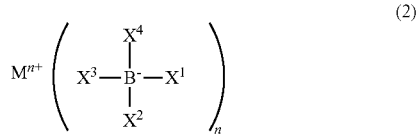

(2)

in which the $M^{n+}$ represents an alkali metal ion, an alkaline earth metal ion, an aluminum ion, a transition metal ion or an onium ion, the $X^1$ to $X^4$ are each independent and one or a combination of two optionally selected from the $X^1$ to $X^4$ form a cyclic structure of —OOC—Y—COO—, —O—Y—O— or —OOC—Y—O— in which the Y represents a hydrocarbon group having 0 to 20 carbon atoms or a hydrocarbon group having 0 to 20 carbon atoms and having a heteroatom, an unsaturated bond or a cyclic structure, or the $X^1$ to $X^4$ each independently represent a halogen atom, an alkyl group having 0 to 20 carbon atoms, an alkoxy group having 0 to 20 carbon atoms, an alkyl group having 0 to 20 carbon atoms and having at least any one of a halogen atom, a heteroatom and an unsaturated bond, or an alkoxy group having 0 to 20 carbon atoms and having at least any one of a halogen atom, a heteroatom and an unsaturated bond, and the n represents a valence,

[Chemical Formula 3]

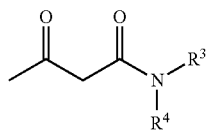

(3)

in which the $R^3$ and $R^4$ each independently represent any of a hydrocarbon group having 1 to 20 carbon atoms and a hydrocarbon group having 1 to 20 carbon atoms and having a halogen atom, a heteroatom or an unsaturated bond.

In the above configuration, it is preferred that an addition amount of the component (A) is 0.05% by mass to 5% by mass of a total mass of the nonaqueous electrolytic solution for a secondary battery, and an addition amount of the component (B) is 0.05% by mass to 5% by mass of a total mass of the nonaqueous electrolytic solution for a secondary battery.

In the above configuration, it is preferred that the component (A) is any of lithium diethyl phosphate and lithium bis(2,2,2-trifluoroethyl)phosphate.

In the above configuration, it is preferred that the boron complex salt represented by the general formula (2) of the component (B) is triethylmethylammonium bis(oxalato)borate, lithium bis(salicylato)borate or lithium bis[1,2'-benzenediolato(2)-O,O']borate.

In the above configuration, it is preferred that trimethyl borate is used as the boric acid esters.

In the above configuration, it is preferred that a maleic anhydride is used as the acid anhydrides.

In the above configuration, it is preferred that vinylene carbonate is used as the cyclic carbonates having an unsaturated bond.

In the above configuration, it is preferred that fluoroethylene carbonate is used as the cyclic carbonates having a halogen atom.

In the above configuration, it is preferred that propane sultone is used as the cyclic sulfonic acid esters.

In the above configuration, it is preferred that N,N-dimethylacetoacetamide is used as the amines represented by the general formula (3) and having an acetoacetyl group.

In order to solve the above-mentioned problems, the secondary battery according to the present invention comprises at least: the nonaqueous electrolytic solution for secondary batteries; a positive electrode; and a negative electrode.

According to the present invention, it is possible to provide a nonaqueous electrolytic solution for a secondary battery capable of exhibiting excellent cycle characteristics even in high-temperature environments; and a secondary battery including the nonaqueous electrolytic solution. Although the mechanism of the excellent characteristics itself is not clear, it is presumed that by containing at least one type of the component (A) and the component (B), a coating is formed on the surface of an electrode active material, and therefore cycle characteristics in high-temperature environments are improved by properties of the coating, that is, characteristics such as thermal stability and coating quality.

BRIEF DESCRIPTION OF THE DRAWING

FIG. 1 is a schematic sectional view showing an outline of a lithium ion secondary battery including a nonaqueous electrolytic solution for a secondary battery of an embodiment of the present invention.

DETAILED DESCRIPTION (Nonaqueous Electrolytic Solution for Secondary Battery)

A nonaqueous electrolytic solution for a secondary battery (hereinafter, referred to as "nonaqueous electrolytic solution") of the present embodiment is an electrolytic solution in which an organic solvent (nonaqueous solvent) including an electrolyte dissolved therein contains at least one type of the following component (A) and the following component (B).

An irreversible reaction of decomposition of the nonaqueous electrolytic solution takes place at an interface between the electrode and the nonaqueous electrolytic solution in initial charge. It is thought that properties of a coating to be formed, for example, properties such as thermal stability, ionic conductivity, morphology and denseness, vary significantly according to an electrode active material, types of the nonaqueous solvent, the electrolyte and additives in the nonaqueous electrolytic solution and charge-discharge conditions. Also in the present embodiment, it is thought that by adding the component (A) to the component (B) to the nonaqueous electrolytic solution, a coating is formed on the surface of an electrode active material, and storage characteristics of the secondary battery in high-temperature environments (e.g., 40° C. to 60° C.) are improved resulting from the properties of the coating, that is, the effects of thermal stability and coating quality.

<Component (A)>

With respect to the component (A), at least one kind is contained in the nonaqueous electrolytic solution and represented by the following general formula (1).

[Chemical Formula 4]

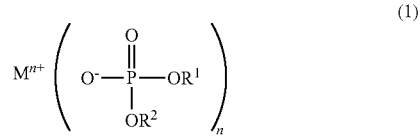

$$M^{n+} \left( O^- - \overset{\overset{O}{\|}}{\underset{OR^2}{P}} - OR^1 \right)_n \quad (1)$$

In the general formula (1), the $M^{n+}$ represents an alkali metal ion, an alkaline earth metal ion, an aluminum ion, a transition metal ion or an onium ion.

The alkali metal ion is not particularly limited, and examples thereof include a lithium ion, a sodium ion, a potassium ion, a rubidium ion, a cesium ion and the like. These alkali metal ions may be used alone or may be used in combination of two kinds or more thereof.

Examples of the alkaline earth metal ion include a magnesium ion, a calcium ion, a strontium ion, a barium ion and the like. These alkaline earth metal ions may be used alone or may be used in combination of two kinds or more thereof.

The transition metal ion is not particularly limited, and examples thereof include a manganese ion, a cobalt ion, a nickel ion, a chromium ion, a copper ion, a molybdenum ion, a tungsten ion, a vanadium ion and the like. These transition metal ions may be used alone or may be used in combination of two kinds or more thereof.

Examples of the onium ion include an ammonium ion ($NH^{4+}$), a primary ammonium ion, a secondary ammonium ion, a tertiary ammonium ion, a quaternary ammonium ion, a quaternary phosphonium ion, a sulfonium ion and the like.

The primary ammonium ion is not particularly limited, and examples thereof include a methylammonium ion, an ethylammonium ion, a propylammonium ion, an isopropylammonium ion and the like. These primary ammonium ions may be used alone or may be used in combination of two kinds or more thereof.

The secondary ammonium ion is not particularly limited, and examples thereof include a dimethylammonium ion, a diethylammonium ion, a dipropylammonium ion, a dibutylammonium ion, an ethyl(methyl)ammonium ion, a methyl propyl ammonium ion, a methyl butyl ammonium ion, a propyl butyl ammonium ion, a diisopropylammonium ion and the like. These secondary ammonium ions may be used alone or may be used in combination of two kinds or more thereof.

Tertiary ammonium to form the tertiary ammonium ion is not particularly limited, and examples thereof include a trimethylammonium ion, a triethylammonium ion, a tripropylammonium ion, a tributylammonium ion, an ethyl dimethyl ammonium ion, a diethyl(methyl)ammonium ion, a triisopropylammonium ion, a dimethyl isopropyl ammonium ion, a diethyl isopropyl ammonium ion, a dimethyl propyl ammonium ion, a butyl dimethyl ammonium ion, a 1-methylpyrrolidinium ion, a 1-ethylpyrrolidinium ion, a 1-propylpyrrolidinium ion, a 1-butylpropylpyrrolidinium ion, a 1-methylimidazolium ion, a 1-ethylimidazolium ion, a 1-propylimidazolium ion, a 1-butylimidazolium ion, a pyrazolium ion, a 1-methylpyrazolium ion, a 1-ethylpyrazolium ion, a 1-propylpyrazolium ion, a 1-butylpyrazolium ion, a pyridinium ion and the like. These tertiary ammonium ions may be used alone or may be used in combination of two kinds or more thereof.

Quaternary ammonium to form the quaternary ammonium ion is not particularly limited, and examples thereof include aliphatic quaternary ammoniums, imidazoliums, pyridiniums, pyrazoliums, pyridaziniums and the like. These quaternary ammonium ions may be used alone or may be used in combination of two kinds or more thereof.

Moreover, the aliphatic quaternary ammoniums are not particularly limited, and examples thereof include tetraethylammonium, tetrapropylammonium, tetraisopropylammonium, trimethyl ethyl ammonium, dimethyl diethyl ammonium, methyl triethyl ammonium, trimethyl propyl ammonium, trimethyl isopropyl ammonium, tetrabutylammonium, trimethyl butyl ammonium, trimethyl pentyl ammonium, trimethyl hexyl ammonium, 1-ethyl-1-methylpyrrolidinium, 1-methyl-1-propylpyrrolidinium, 1-butyl-1-methylpyrrolidinium, 1-ethyl-1-methylpiperidinium, 1-butyl-1-methylpiperidinium and the like. These aliphatic quaternary ammonium ions may be used alone or may be used in combination of two kinds or more thereof.

The imidazoliums are not particularly limited, and examples thereof include 1,3-dimethyl-imidazolium, 1-ethyl-3-methylimidazolium, 1-n-propyl-3-methylimidazolium, 1-n-butyl-3-methylimidazolium, 1-n-hexyl-3-methylimidazolium and the like. These imidazoliums may be used alone or may be used in combination of two kinds or more thereof.

The pyridiniums are not particularly limited, and examples thereof include 1-methylpyridinium, 1-ethylpyridinium, 1-n-propylpyridinium and the like. These pyridiniums may be used alone or may be used in combination of two kinds or more thereof.

The pyrazoliums are not particularly limited, and examples thereof include 1,2-dimethylpyrazolium, 1-methyl-2-ethylpyrazolium, 1-propyl-2-methylpyrazolium, 1-methyl-2-butylpyrazolium, 1-methylpyrazolium, 3-methylpyrazolium, 4-methylpyrazolium, 4-iodopyrazolium, 4-bromopyrazolium, 4-iodo-3-methylpyrazolium, 4-bromo-3-methylpyrazolium and 3-trifluoromethylpyrazolium. These pyrazoliums may be used alone or may be used in combination of two kinds or more thereof.

The pyridaziniums are not particularly limited, and examples thereof include 1-methylpyridazinium, 1-ethylpyridazinium, 1-propylpyridazinium, 1-butylpyridazinium, 3-methylpyridazinium, 4-methylpyridazinium, 3-methoxypyridazinium, 3,6-dichloropyridazinium, 3,6-dichloro-4-methylpyridazinium, 3-chloro-6-methylpyridazinium and 3-chloro-6-methoxypyridazinium. These pyridaziniums may be used alone or may be used in combination of two kinds or more thereof.

Quaternary phosphonium to form the quaternary phosphonium ion is not particularly limited, and examples thereof include benzyltriphenylphosphonium, tetraethylphosphonium, tetraphenylphosphonium and the like. These phosphoniums may be used alone or may be used in combination of two kinds or more thereof.

The sulfonium ion is not particularly limited, and examples thereof include trimethylsulfonium, triphenylsulfonium, triethylsulfonium and the like. These sulfoniums may be used alone or may be used in combination of two kinds or more thereof.

Of the ions as described as an exemplification of the $M^{n+}$, lithium ions, sodium ions and tetraalkylammonium ions are preferred from the viewpoint of ease of availability.

In the general formula (1), the $R^1$ and $R^2$ each independently represent a hydrocarbon group or a hydrocarbon group having at least any one of a halogen atom, a heteroatom and an unsaturated bond (hereinafter, referred to as a "hydrocarbon group having a halogen atom or the like"). The hydrocarbon group has 1 to 20 carbon atoms, preferably 1 to 10 carbon atoms, and more preferably 1 to 4 carbon atoms. The hydrocarbon group having a halogen atom or the like has 1 to 20 carbon atoms, preferably 1 to 10 carbon atoms, and more preferably 1 to 4 carbon atoms. Also, the number of the unsaturated bonds is preferably in a range of 1 to 10, more preferably in a range of 1 to 5, and particularly preferably in a range of 1 to 3.

Specific examples of the above-mentioned hydrocarbon groups or hydrocarbon groups having a halogen atom or the like include chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; halogen-containing chain alkyl groups such as a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a hexafluoro-2-propyl group; halogen-containing cyclic alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and 3-cyclohexenyl group; chain alkynyl groups such as a 2-propynyl group, a 1-butynyl group, a 2-butynyl group, a 3-butynyl group, a 1-pentynyl group, a 2-pentynyl group, a 3-pentynyl group and 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; and naphthyl groups such as a 1-naphthyl group, a 2-naphthyl group and a 3-amino-2-naphthyl group.

In addition, the halogen atom means an atom of fluorine, chlorine, bromine or iodine, and a part of or all of hydrogens in the hydrocarbon group may be substituted with any of these halogen atoms. The heteroatom means an atom of oxygen, nitrogen, sulfur or the like. Furthermore, the number of the unsaturated bonds is preferably in a range of 1 to 10, more preferably in a range of 1 to 5, and particularly preferably in a range of 1 to 3.

Furthermore, the $R^1$ and $R^2$ are any of the hydrocarbon group and the hydrocarbon group having a halogen atom or the like, and may be coupled to each other to form a cyclic structure. In this case, specific examples of the above-mentioned hydrocarbon groups or hydrocarbon groups having a halogen atom or the like include linear alkylene groups such as a methylene group, an ethylene group, a propylene group, a butylene group, a pentylene group, a hexylene group, a heptylene group, an octylene group and a nonylene group; halogen-containing linear alkylene groups such as an iodomethylene group, a diiodomethylene group, a bromomethylene group, a dibromomethylene group, a fluoromethylene group, a difluoromethylene group, an iodoethylene group, a 1,1-diiodoethylene group, a 1,2-diiodoethylene group, a triiodoethylene group, a tetraiodoethylene group, a chloroethylene group, a 1,1-dichloroethylene group, a 1,2-dichloroethylene group, a trichloroethylene group, a tetrachloroethylene group, a fluoroethylene group, a 1,1-difluoroethylene group, a 1,2-difluoroethylene group, a trifluoroethylene group and a tetrafluoroethylene group; and cyclic hydrocarbon groups, such as a cyclohexylene group, a phenylene group, a benzylene group, a naphthylene group, an anthracylene group, a naphthacylene group and a pentacylene group, and a part or all thereof substituted with halogen atoms.

The $R^1$ and the $R^2$ may be the same or may be different from each other. A group of the functional groups described above is merely an exemplification, and the functional group is not limited to these functional groups.

In addition, in the general formula (1), the n represents a valence. For example, when the M is a monovalent cation, n=1, and n=2 in the case of a divalent cation, and n=3 in the case of a trivalent cation.

Specific examples of the compounds represented by the general formula (1) include lithium dimethyl phosphate, lithium diethyl phosphate, lithium dipropyl phosphate, lithium dibutyl phosphate, lithium dipentyl phosphate, lithium bis(2,2,2-trifluoroethyl)phosphate, lithium bis(1,1,1,3,3,3-hexafluoro-2-propyl)phosphate, lithium methyl(2,2,2-trifluoroethyl)phosphate, lithium ethyl(2,2,2-trifluoroethyl) phosphate, lithium methyl(1,1,1,3,3,3-hexafluoro-2-propyl) phosphate, lithium ethyl(1,1,1,3,3,3-hexafluoro-2-propyl) phosphate, lithium ethylenephosphate, lithium binaphthylphosphate, sodium dimethyl phosphate, sodium diethyl phosphate, sodium dipropyl phosphate, sodium dibutyl phosphate, sodium dipentyl phosphate, sodium bis (2,2,2-trifluoroethyl)phosphate, sodium bis(1,1,1,3,3,3-hexafluoro-2-propyl)phosphate, sodium methyl(2,2,2-trifluoroethyl)phosphate, sodium ethyl(2,2,2-trifluoroethyl) phosphate, sodium methyl(1,1,1,3,3,3-hexafluoro-2-propyl) phosphate, sodium ethyl(1,1,1,3,3,3-hexafluoro-2-propyl) phosphate, magnesium ethylenephosphate, magnesium binaphthylphosphate, magnesium dimethyl phosphate, magnesium diethyl phosphate, magnesium dipropyl phosphate, magnesium dibutyl phosphate, magnesium dipentyl phosphate, magnesium bis(2,2,2-trifluoroethyl)phosphate, magnesium bis(1,1,1,3,3,3-hexafluoro-2-propyl)phosphate, magnesium methyl(2,2,2-trifluoroethyl)phosphate, magnesium ethyl(2,2,2-trifluoroethyl)phosphate, magnesium methyl(1,1,1,3,3,3-hexafluoro-2-propyl)phosphate, magnesium ethyl(1,1,1,3,3,3-hexafluoro-2-propyl)phosphate, magnesium ethylenephosphate, magnesium binaphthylphosphate, triethylmethylammonium dimethyl phosphate, triethylmethylammonium diethyl phosphate, triethylmethylammonium dipropyl phosphate, triethylmethylammonium dibutyl phosphate, triethylmethylammonium dipentyl phosphate, triethylmethylammonium bis(2,2,2-trifluoroethyl) phosphate, triethylmethylammonium bis(1,1,1,3,3,3-hexafluoro-2-propyl)phosphate, triethylmethylammonium methyl(2,2,2-trifluoroethyl)phosphate, triethylmethylammonium ethyl(2,2,2-trifluoroethyl)phosphate, triethylmethylammonium methyl(1,1,1,3,3,3-hexafluoro-2-propyl)phosphate, triethylmethylammonium ethyl(1,1,1,3,3,3- hexafluoro-2-propyl)phosphate, triethylmethylammonium ethylenephosphate and triethylmethylammonium binaphthylphosphate. However, these compounds are merely an exemplification, and the present embodiment is not limited to these compounds.

In addition, the compounds represented by the general formula (1) is preferably lithium diethyl phosphate or lithium bis(2,2,2-trifluoroethyl)phosphate from the viewpoint of ease of availability.

An addition amount of the component (A) is preferably in a range of 0.05% by mass to 5% by mass, more preferably in a range of 0.1% by mass to 3% by mass, and particularly preferably in a range of 0.5% by mass to 2% by mass of a total mass of the nonaqueous electrolytic solution. When the addition amount is 0.05% by mass or more, it is possible to further improve the cycle characteristics of a secondary battery in high-temperature environments. On the other hand, when the addition amount is 5% by mass or less, it is possible to suppress lowering of the solubility of an electrolyte of a nonaqueous electrolytic solution in a solvent of a nonaqueous electrolytic solution.

Further, in the present embodiment, with respect to the component (A), at least one type of the component (A) has to be contained in the nonaqueous electrolytic solution; however, the number of types of the component (A) to be contained is 1 to 5, more preferably 1 to 3, and particularly preferably 1 to 2. By reducing the number of types of the component (A), it is possible to reduce the complication of a process step in producing a nonaqueous electrolytic solution.

<Component (B)>

The component (B) contains any one of the following component (b1) and the following component (b2).

Component (b1): one type of boron complex salts Component (b2): at least one type of compound selected from the group consisting of boric acid esters, acid anhydrides, cyclic carbonates having an unsaturated bond, cyclic carbonates having a halogen atom, cyclic sulfonic acid esters, and amines having an acetoacetyl group The boron complex salt of the component (b1) is specifically represented by the following general formula (2).

[Chemical Formula 5]

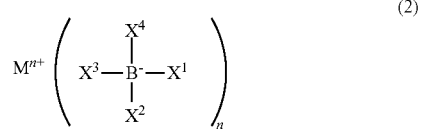

(2)

In the general formula (2), the $M^{n+}$ is as described above and represents an alkali metal ion, an alkaline earth metal ion, an aluminum ion, a transition metal ion or an onium ion. Accordingly, detailed description about these substances will be omitted here.

In the general formula (2), the $X^1$ to $X^4$ are each independent and one or a combination of two optionally selected from the $X^1$ to $X^4$ represents a cyclic structure of —O—Y—O— or —OOC—Y—O— formed. The Y in this case represents a hydrocarbon group having 1 to 20 carbon atoms, preferably 1 to 10 carbon atoms and more preferably 1 to 5 carbon atoms, or a hydrocarbon group having 1 to 20 carbon atoms, preferably 1 to 10 carbon atoms and more preferably 1 to 5 carbon atoms, and having a heteroatom, an unsaturated bond or a cyclic structure. When the $X^1$ to $X^4$ have two sets of any one of the cyclic structure of —O—Y—O— and the cyclic structure of —OOC—Y—O— or have each of the cyclic structure of —O—Y—O— and the cyclic structure of —OOC—Y—O—, the Ys in the respective cyclic structures may be different. Herein, the heteroatom means an oxygen atom, a nitrogen atom or a sulfur atom.

Specific examples of the above-mentioned Y include linear alkylene groups such as a methylene group, an ethylene group, a propylene group, a butylene group, a pentylene group, a hexylene group, a heptylene group, an octylene group and a nonylene group; halogen-containing linear alkylene groups such as an iodomethylene group, a diiodomethylene group, a bromomethylene group, a dibromomethylene group, a fluoromethylene group, a difluoromethylene group, an iodoethylene group, a 1,1-diiodoethylene group, a 1,2-diiodoethylene group, a triiodoethylene group, a tetraiodoethylene group, a chloroethylene group, a 1,1-dichloroethylene group, a 1,2-dichloroethylene group, a trichloroethylene group, a tetrachloroethylene group, a fluoroethylene group, a 1,1-difluoroethylene group, a 1,2-difluoroethylene group, a trifluoroethylene group and a tetrafluoroethylene group; and cyclic hydrocarbon groups, such as a cyclohexylene group, a phenylene group, a benzylene group, a naphthylene group, an anthracylene group, a naphthacylene group and a pentacylene group, and a part or all thereof substituted with halogens. In addition, these functional groups are merely an exemplification, and the present embodiment is not limited to these functional groups.

Furthermore, when the Y has 0 carbon atom, —OOC—Y—COO— is —OOC—COO—, and represents an oxalate group. Further, when the Y is a 1,2-phenylene group, —O—Y—O— represents a benzenediolate group, and —O—Y—COO— represents a salicylate group.

In addition, functional groups of the Y described above are merely an exemplification, and the present embodiment is not limited to these functional groups.

Also, the $X^1$ to $X^4$ are each independent and may be a halogen atom, an alkyl group having 0 to 20 carbon atoms, preferably 0 to 10 carbon atoms and more preferably 0 to 5 carbon atoms, an alkoxy group having 0 to 20 carbon atoms, preferably 0 to 10 carbon atoms and more preferably 0 to 5 carbon atoms, an alkyl group having 0 to 20 carbon atoms, preferably 0 to 10 carbon atoms and more preferably 0 to 5 carbon atoms and having at least any one of a halogen atom, a heteroatom, an unsaturated bond and a cyclic structure, or an alkoxy group having 0 to 20 carbon atoms, preferably 0 to 10 carbon atoms and more preferably 0 to 5 carbon atoms and having at least any one of a halogen atom, a heteroatom, an unsaturated bond and a cyclic structure. Herein, the halogen atom means a fluorine atom, a chlorine atom, a bromine atom or an iodine atom. The heteroatom means an oxygen atom, a nitrogen atom or a sulfur atom.

Specific examples of the above-mentioned $X^1$ to $X^4$ include chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; halogen-containing chain alkyl groups such as an iodomethyl group, a bromomethyl group, a chloromethyl group, a fluoromethyl group, a diiodomethyl group, a dibromomethyl group, a dichloromethyl group, a difluoromethyl group, a triiodomethyl group, a tribromomethyl group, a trichloromethyl group, a trifluoromethyl group, a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a hexafluoro-2-propyl group; halogen-containing cyclic alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and 3-cyclohexenyl group; chain alkynyl groups such as a 2-propynyl group, a 1-butynyl group, a 2-butynyl group, a 3-butynyl group, a 1-pentynyl group, a 2-pentynyl group, a 3-pentynyl group and 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; chain alkoxy groups such as a methoxy group, an ethoxy group, a propoxy group, a butoxy group, a pentoxy group and a hexoxy group; cyclic alkoxy groups such as a cyclopentoxy group and a cyclohexoxy group; halogen-containing chain alkyl groups such as a 2-iodoethoxy group, a 2-bromoethoxy group, a 2-chloroethoxy group, a 2-fluoroethoxy group, a 1,2-diiodoethoxy group, a 1,2-dibromoethoxy group, a 1,2-dichloroethoxy group, a 1,2-difluoroethoxy group, a 2,2-diiodoethoxy group, a 2,2-dibromoethoxy group, a 2,2-dichloroethoxy group, a 2,2-difluoroethoxy group, a 2,2,2-tribromoethoxy group, a 2,2,2-trichloroethoxy group, a 2,2,2-trifluoroethoxy group and a hexafluoro-2-propoxy group; halogen-containing cyclic alkyl groups such as a 2-iodocyclohexoxy group, a 2-bromocyclohexoxy group, a 2-chlorocyclohexoxy group and a 2-fluorocyclohexoxy group; chain alkenylalkoxy groups such as a 2-propexy group, an isopropexy group, a 2-butexy group and a 3-butexy group; cyclic alkenylalkoxy groups such as a 2-cyclopentexy group, a 2-cyclohexexy group and a 3-cyclohexexy group; chain alkynylalkoxy groups such as a 2-propyxy group, a 1-butyxy group, a 2-butyxy group, a 3-butyxy group, a 1-pentyxy group, a 2-pentyxy group, a 3-pentyxy group and a 4-pentyxy group; phenoxy groups such as a phenoxy group, a 3-methoxy group, a phenoxy group, a 4-methoxy group, a phenoxy group, a 3,5-dimethoxy group and a phenoxy group; and halogen-containing phenoxy groups such as a 2-iodophenoxy group, a 2-bromophenoxy group, a 2-chlorophenoxy group, a 2-fluorophenoxy group, a 3-iodophenoxy group, a 3-bromophenoxy group, a 3-chlorophenoxy group, a 3-fluorophenoxy group, a 4-iodophenoxy group, a 4-bromophenoxy group, a 4-chlorophenoxy group, a 4-fluorophenoxy group, a 3,5-diiodophenoxy group, a 3,5-dibromophenoxy group, a 3,5-dichlorophenoxy group and a 3,5-difluorophenoxy group.

The above-mentioned $X^1$ to $X^4$ may be the same or may be different. A group of the functional groups described above as the $X^1$ to $X^4$ is merely an exemplification, and the present embodiment is not limited to these functional groups.

Specific examples of the compounds represented by the general formula (2) include lithium bis(oxalato)borate, lithium bis(malonato)borate, lithium bis(salicylato)borate, lithium bis[1,2'-benzenediolato(2)-O,O']borate, lithium (oxalato malonato)borate, lithium (oxalato salicylato)borate, lithium oxalato[1,2'-benzenediolato(2)-O,O']borate, lithium diiodooxalatoborate, lithium dibromooxalatoborate, lithium dichlorooxalatoborate, lithium difluorooxalatoborate, lithium iodochlorooxalatoborate, lithium iodobromooxalatoborate, lithium iodofluorooxalatoborate, lithium bromochlorooxalatoborate, lithium bromofluorooxalatoborate, lithium chlorofluorooxalatoborate, lithium diiodomalonatoborate, lithium dibromomalonatoborate, lithium dichloromalonatoborate, lithium difluoromalonatoborate, lithium iodochloromalonatoborate, lithium iodobromomalonatoborate, lithium iodofluoromalonatoborate, lithium bromochloromalonatoborate, lithium bromofluoromalonatoborate, lithium chlorofluoromalonatoborate, lithium diiodosalicylatoborate, lithium dibromosalicylatoborate, lithium dichlorosalicylatoborate, lithium difluorosalicylatoborate, lithium iodochlorosalicylatoborate, lithium iodobromosalicylatoborate, lithium iodofluorosalicylatoborate, lithium bromochlorosalicylatoborate, lithium bromofluorosalicylatoborate, lithium chlorofluorosalicylatoborate, lithium diiodo[1,2'-benzenediolato(2)-O,O']borate, lithium dibromo[1,2'-benzenediolato(2)-O,O']borate, lithium dichloro[1,2'-benzenediolato(2)-O,O']borate, lithium difluoro[1,2'-benzenediolato(2)-O,O']borate, lithium iodochloro[1,2'-benzenediolato(2)-O,O']borate, lithium iodobromo[1,2'-benzenediolato(2)-O,O']borate, lithium iodofluoro[1,2'-benzenediolato(2)-O,O']borate, lithium bromochloro[1,2'-benzenediolato(2)-O,O']borate, lithium bromofluoro[1,2'-benzenediolato(2)-O,O']borate, lithium chlorofluoro[1,2'-benzenediolato(2)-O,O']borate, lithium tetraiodoborate, lithium tetrabromoborate, lithium tetrachloroborate, lithium tetrafluoroborate, lithium iodotribromoborate, lithium iodotrichloroborate, lithium iodotrifluoroborate, lithium diiododibromoborate, lithium diiododichloroborate, lithium diiododifluoroborate, lithium triiodobromoborate, lithium triiodochloroborate, lithium triiodofluoroborate, lithium bromotrichloroborate, lithium bromotrifluoroborate, lithium dibromodichloroborate, lithium dibromodifluoroborate, lithium tribromochloroborate, lithium tribromofluoroborate, lithium chlorotrifluoroborate, lithium dichlorodifluoroborate, lithium chlorotrifluoroborate, lithium iodobromochlorofluoroborate, lithium tetramethyl borate, lithium tetraethyl borate, lithium tetraphenyl borate, lithium tetramethoxy borate, lithium tetraethoxy borate, lithium tetraphenoxy borate, lithium ethyl dimethyl phenyl borate, lithium butyl ethyl methyl phenyl borate, lithium ethoxy dimethoxy phenoxy borate, lithium dimethyl oxalatoborate, lithium dimethyl malonatoborate, lithium dimethyl salicylatoborate, lithium dimethyl [1,2'-benzenediolato(2)-O,O']borate, lithium ethyl methyl oxalatoborate, lithium phenyl methyl oxalatoborate, lithium iodomethyl oxalatoborate, lithium bromomethyl oxalatoborate, lithium chloromethyl oxalatoborate, lithium fluoromethyl oxalatoborate, lithium iodoethyl oxalatoborate, lithium bromoethyl oxalatoborate, lithium chloroethyl oxalatoborate, lithium fluoroethyl oxalatoborate, lithium ethoxy methoxy oxalatoborate, lithium iodomethoxy oxalatoborate, lithium bromomethoxy oxalatoborate, lithium chloromethoxy oxalatoborate, lithium fluoromethoxy oxalatoborate and the like.

Further, examples of the compounds represented by the general formula (2) also include sodium bis(oxalato)borate, sodium bis(malonato)borate, sodium bis(salicylato)borate, sodium bis[1,2'-benzenediolato(2)-O,O']borate, sodium (oxalato malonato)borate, sodium (oxalato salicylato)borate, sodium oxalato [1,2'-benzenediolato(2)-O,O']borate, sodium diiodooxalatoborate, sodium dibromooxalatoborate, sodium dichlorooxalatoborate, sodium difluorooxalatoborate, sodium iodochlorooxalatoborate, sodium iodobromooxalatoborate, sodium iodofluorooxalatoborate, sodium bromochlorooxalatoborate, sodium bromofluorooxalatoborate, sodium chlorofluorooxalatoborate, sodium diiodomalonatoborate, sodium dibromomalonatoborate, sodium dichloromalonatoborate, sodium difluoromalonatoborate, sodium iodochloromalonatoborate, sodium iodobromomalonatoborate, sodium iodofluoromalonatoborate, sodium bromochloromalonatoborate, sodium bromofluoromalonatoborate, sodium chlorofluoromalonatoborate, sodium diiodosalicylatoborate, sodium dibromosalicylatoborate, sodium dichlorosalicylatoborate, sodium difluorosalicylatoborate, sodium iodochlorosalicylatoborate, sodium iodobromosalicylatoborate, sodium iodofluorosalicylatoborate, sodium bromochlorosalicylatoborate, sodium bromofluorosalicylatoborate, sodium chlorofluorosalicylatoborate, sodium diiodo[1,2'-benzenediolato(2)-O,O']borate, sodium dibromo [1,2'-benzenediolato(2)-O,O']borate, sodium dichloro [1,2'-benzenediolato(2)-O,O']borate, sodium difluoro[1,2'-benzenediolato(2)-O,O']borate, sodium iodochloro [1,2'-benzenediolato(2)-O,O']borate, sodium iodobromo[1,2'-benzenediolato(2)-O,O']borate, sodium iodofluoro [1,2'-benzenediolato(2)-O,O']borate, sodium bromochloro [1,2'-benzenediolato(2)-O,O']borate, sodium bromofluoro [1,2'-benzenediolato(2)-O,O']borate, sodium chlorofluoro[1,2'-benzenediolato(2)-O,O']borate, sodium tetraiodoborate, sodium tetrabromoborate, sodium tetrachloroborate, sodium tetrafluoroborate, sodium iodotribromoborate, sodium iodotrichloroborate, sodium iodotrifluoroborate, sodium diiododibromoborate, sodium diiododichloroborate, sodium diiododifluoroborate, sodium triiodobromoborate, sodium triiodochloroborate, sodium triiodofluoroborate, sodium bromotrichloroborate, sodium bromotrifluoroborate, sodium dibromodichloroborate, sodium dibromodifluoroborate, sodium tribromochloroborate, sodium tribromofluoroborate, sodium chlorotrifluoroborate, sodium dichlorodifluoroborate, sodium chlorotrifluoroborate, sodium iodobromochlorofluoroborate, sodium tetramethyl borate, sodium tetraethyl borate, sodium tetraphenyl borate, sodium tetramethoxy borate, sodium tetraethoxy borate, sodium tetraphenoxy borate, sodium ethyl dimethyl phenyl borate, sodium butyl ethyl methyl phenyl borate, sodium ethoxy dimethoxy phenoxy borate, sodium dimethyl oxalatoborate, sodium dimethyl malonatoborate, sodium dimethyl salicylatoborate, sodium dimethyl [1,2'-benzenediolato(2)-O,O']borate, sodium ethyl methyl oxalatoborate, sodium phenyl methyl oxalatoborate, sodium iodomethyl oxalatoborate, sodium bromomethyl oxalatoborate, sodium chloromethyl oxalatoborate, sodium fluoromethyl oxalatoborate, sodium iodoethyl oxalatoborate, sodium bromoethyl oxalatoborate, sodium chloroethyl oxalatoborate, sodium fluoroethyl oxalatoborate, sodium ethoxy methoxy oxalatoborate, sodium iodomethoxy oxalatoborate, sodium bromomethoxy oxalatoborate, sodium chloromethoxy oxalatoborate, sodium fluoromethoxy oxalatoborate and the like.

Moreover, examples of the compounds represented by the general formula (2) also include triethylmethylammonium bis(oxalato)borate, triethylmethylammonium bis(malonato) borate, triethylmethylammonium bis(salicylato)borate, triethylmethylammonium bis [1,2'-benzenediolato(2)-O,O'] borate, triethylmethylammonium (oxalato malonato)borate, triethylmethylammonium (oxalato salicylato)borate, triethylmethylammonium oxalato[1,2'-benzenediolato(2)-O,O'] borate, triethylmethylammonium diiodooxalatoborate, triethylmethylammonium dibromooxalatoborate, triethylmethylammonium dichlorooxalatoborate, triethylmethylammonium difluorooxalatoborate, triethylmethylammonium iodochlorooxalatoborate, triethylmethylammonium iodobromooxalatoborate, triethylmethylammonium iodofluorooxalatoborate, triethylmethylammonium bromochlorooxalatoborate, triethylmethylammonium bromofluorooxalatoborate, triethylmethylammonium chlorofluorooxalatoborate, triethylmethylammonium diiodomalonatoborate, triethylmethylammonium dibromomalonatoborate, triethylmethylammonium dichloromalonatoborate, triethylmethylammonium difluoromalonatoborate, triethylmethylammonium iodochloromalonatoborate, triethylmethylammonium iodobromomalonatoborate, triethylmethylammonium iodofluoromalonatoborate, triethylmethylammonium bromochloromalonatoborate, triethylmethylammonium bromofluoromalonatoborate, triethylmethylammonium chlorofluoromalonatoborate, triethylmethylammonium diiodosalicylatoborate, triethylmethylammonium dibromosalicylatoborate, triethylmethylammonium dichlorosalicylatoborate, triethylmethylammonium difluorosalicylatoborate, triethylmethylammonium iodochlorosalicylatoborate, triethylmethylammonium iodobromosalicylatoborate, triethylmethylammonium iodofluorosalicylatoborate, triethylmethylammonium bromochlorosalicylatoborate, triethylmethylammonium bromofluorosalicylatoborate, triethylmethylammonium chlorofluorosalicylatoborate, triethylmethylammonium diiodo[1,2'-benzenediolato(2)-O,O']borate, triethylmethylammonium dibromo[1,2'-benzenediolato(2)-O,O']borate, triethylmethylammonium dichloro [1,2'-benzenediolato(2)-O,O']borate, triethylmethylammonium difluoro[1,2'-benzenediolato(2)-O,O']borate, triethylmethylammonium iodochloro[1,2'-benzenediolato(2)-O,O']borate, triethylmethylammonium iodobromo[1,2'-benzenediolato(2)-O,O']borate, triethylmethylammonium iodofluoro [1,2'-benzenediolato(2)-O,O']borate, triethylmethylammonium bromochloro[1,2'-benzenediolato(2)-O,O']borate, triethylmethylammonium bromofluoro [1,2'-benzenediolato(2)-O,O']borate, triethylmethylammonium chlorofluoro[1,2'-benzenediolato(2)-O,O'] borate, triethylmethylammonium tetraiodoborate, triethylmethylammonium tetrabromoborate, triethylmethylammonium tetrachloroborate, triethylmethylammonium tetrafluoroborate, triethylmethylammonium iodotribromoborate, triethylmethylammonium iodotrichloroborate, triethylmethylammonium iodotrifluoroborate, triethylmethylammonium diiododibromoborate, triethylmethylammonium diiododichloroborate, triethylmethylammonium diiododifluoroborate, triethylmethylammonium triiodobromoborate, triethylmethylammonium triiodochloroborate, triethylmethylammonium triiodofluoroborate, triethylmethylammonium bromotrichloroborate, triethylmethylammonium bromotrifluoroborate, triethylmethylammonium dibromodichloroborate, triethylmethylammonium dibromodifluoroborate, triethylmethylammonium tribromochloroborate, triethylmethylammonium tribromofluoroborate, triethylmethylammonium chlorotrifluoroborate, triethylmethylammonium dichlorodifluoroborate, triethylmethylammonium chlorotrifluoroborate, triethylmethylammonium iodobromochlorofluoroborate, triethylmethylammonium tetramethyl borate, triethylmethylammonium tetraethyl borate, triethylmethylammonium tetraphenyl borate, triethylmethylammonium tetramethoxy borate, triethylmethylammonium tetraethoxy borate, triethylmethylammonium tetraphenoxy borate, triethylmethylammonium dimethyl phenyl borate, triethylmethylammonium butyl ethyl methyl phenyl borate, triethylmethylammonium ethoxy dimethoxy phenoxy borate, triethylmethylammonium dimethyl oxalatoborate, triethylmethylammonium dimethyl malonatoborate, triethylmethylammonium dimethyl salicylatoborate, triethylmethylammonium dimethyl [1,2'-benzenediolato(2)-O,O']borate, triethylmethylammonium ethyl methyl oxalatoborate, triethylmethylammonium phenyl methyl oxalatoborate, triethylmethylammonium iodomethyl oxalatoborate, triethylmethylammonium bromomethyl oxalatoborate, triethylmethylammonium chloromethyl oxalatoborate, triethylmethylammonium fluoromethyl oxalatoborate, triethylmethylammonium iodoethyl oxalatoborate, triethylmethylammonium bromoethyl oxalatoborate, triethylmethylammonium chloroethyl oxalatoborate, triethylmethylammonium fluoroethyl oxalatoborate, triethylmethylammonium ethoxy methoxy oxalatoborate, triethylmethylammonium iodomethoxy oxalatoborate, triethylmethylammonium bromomethoxy oxalatoborate, triethylmethylammonium chloromethoxy oxalatoborate, triethylmethylammonium fluoromethoxy oxalatoborate and the like.

However, a group of compounds described above is merely an exemplification of the compound represented by the general formula (2), and the present embodiment is not limited to these compounds.

In addition, the boron complex salt is preferably lithium bis(oxalato)borate, triethylmethylammonium bis(oxalato)borate, lithium bis(salicylato)borate or lithium bis[1,2'-benzenediolato(2)-O,O']borate from the viewpoint of ease of availability.

Further, the n in the general formula (2), represents a valence as in the case of the general formula (1).

The boric acid ester in the component (b2) is not particularly limited in its type as long as it does not impair the characteristics of the nonaqueous electrolytic solution of the present embodiment and the secondary battery using the same, and various boric acid esters can be selected. Specific examples of the boric acid esters include trimethyl borate, triethyl borate, triisopropyl borate, tributyl borate, tripentyl borate, trihexyl borate, triheptyl borate, triphenyl borate, tris(2,2,2-iodoethyl) diborate, tris(2,2,2-tribromoethyl) borate, tris(2,2,2-trichloroethyl) borate, tris(2,2,2-trifluoroethyl) borate, tris(4-iodophenyl) borate, tris(4-bromophenyl) borate, tris(4-chlorophenyl) borate, tris(4-fluorophenyl) borate, diethyl methyl borate, ethyl dimethyl borate and the like.

The acid anhydride in the component (b2) is not particularly limited in its type as long as it does not impair the characteristics of the nonaqueous electrolytic solution of the present embodiment and the secondary battery using the same, and various acid anhydrides can be selected. Specific examples of the acid anhydrides include linear carboxylic acid anhydrides such as acetic anhydride, propionic anhydride, butylic anhydride, valeric anhydride, hexanoic anhydride, heptanoic anhydride, octanoic anhydride, nonanoic anhydride, decanoic anhydride, eicosanoic anhydride, docosanoic anhydride, benzoic anhydride, 4-methoxybenzoic anhydride, diphenylacetic anhydride, crotonic anhydride, cyclohexanecarboxylic anhydride, elaidic anhydride, isobutyric anhydride, isovaleric anhydride, lauric anhydride, linoleic anhydride, myristic anhydride, angelic anhydride, chlorodifluoroacetic anhydride, trichloroacetic anhydride, difluoroacetic anhydride, trifluoroacetic anhydride and 4-trifluoromethylbenzoic anhydride; cyclic carboxylic acid anhydrides such as phthalic anhydride, 3-acetamidophthalic anhydride, 4,4'-carbonyldiphthalic anhydride, 4,4'-biphthalic anhydride, 3-iodophthalic anhydride, 3-bromophthalic anhydride, 3-chlorophthalic anhydride, 3-fluorophthalic anhydride, 4-iodophthalic anhydride, 4-bromophthalic anhydride, 4-chlorophthalic anhydride, 4-chlorophthalic anhydride, 4,5-diiodophthalic anhydride, 4,5-dibromophthalic anhydride, 4,5-dichlorophthalic anhydride, 4,5-difluorophthalic anhydride, 4,4'-sulfonyldiphthalic anhydride, 3-nitrophthalic anhydride, 4-nitrophthalic anhydride, exo-3,6-epoxyhexahydrophthalic anhydride, exo-3,6-epoxy-1,2,3,6-tetrahydrophthalic anhydride, tetraiodophthalic anhydride, tetrachlorhopthalic anhydride, tetrafluorophthalic anhydride, 4-tert-butylphthalic anhydride, 4-ethynylphthalic anhydride, 4,4'-(hexafluoroisopropylidene)diphthalic anhydride, succinic anhydride, (R)-(+)-2-acetoxysuccinic anhydride, (S)-(−)-2-acetoxysuccinic anhydride, 2-buten-1-ylsuccinic anhydride, butylsuccinic anhydride, decylsuccinic anhydride, 2,3-dimethylsuccinic anhydride, 2-dodecene-1-ylsuccinic anhydride, dodecylsuccinic anhydride, octadecenyl succinic anhydride, (2,7-octadien-1-yl)succinic anhydride, n-octylsuccinic anhydride, hexadecylsuccinic anhydride, maleic anhydride, 2,3-bis(2,4,5-trimethyl-3-thienyl)maleic anhydride, 2-(2-carboxyethyl)-3-methylmaleic anhydride, 2,3-dimethylmaleic anhydride, 2,3-diphenylmaleic anhydride, phenylmaleic anhydride, 4-pentene-1,2-dicarboxylic anhydride, 2,3-anthracenedicarboxylic anhydride, bicyclo[2.2.2]oct-5-ene-2,3-dicarboxylic anhydride, 4-bromo-1,8-naphthalenedicarboxylic anhydride, (+/−)-trans-1,2-cyclohexanedicarboxylic anhydride, cis-1,2,3,6-tetrahydrophthalic anhydride, 2,5-dibromo-3,4-thiophenedicarboxylic anhydride, 5,6-dihydro-1,4-dithiin-2,3-dicarboxylic anhydride, 2,2'-biphenyldicarboxylic anhydride, 4-methylcyclohexane-1,2-dicarboxylic anhydride, 3-methyl-4-cyclohexene-1,2-dicarboxylic anhydride, 4-methyl-4-cyclohexene-1,2-dicarboxylic anhydride, 2,3-naphthalenedicarboxylic anhydride, 3,4-thiophenedicarboxylic anhydride, 1,8-naphthalenedicarboxylic anhydride, 5-norbornene-2,3-dicarboxylic anhydride, 1,2-cyclopropane dicarboxylic anhydride, glutaric anhydride, 3,3-pentamethyleneglutaric anhydride, 2,2-dimethylglutaric anhydride, 3,3-dimethylglutaric anhydride, 3-methylglutaric anhydride, 2-phthalimidoglutaric anhydride, 3,3-tetramethyleneglutaric anhydride, N-methylisatoic anhydride, 4-iodoisatoic anhydride, 4-bromoisatoic anhydride, 4-chloroisatoic anhydride, 4-fluoroisatoic anhydride, 5-iodoisatoic anhydride, 5-bromoisatoic anhydride, 5-chloroisatoic anhydride, 5-fluoroisatoic anhydride, itaconic anhydride, caronic anhydride, citraconic anhydride, diglycolic anhydride, 1,2-naphthalic anhydride, pyromellitic dianhydride, het anhydride and 2,2,3,3,4,4-hexafluoropentanedioic anhydride; linear sulfonic acid anhydrides such as trifluoromethanesulfonic anhydride and p-toluenesulfonic anhydride; cyclic sulfonic acid anhydrides such as 2-sulfobenzoic anhydride, tetraiodo-o-sulfobenzoic anhydride, tetrabromo-o-sulfobenzoic anhydride, tetrachloro-o-sulfobenzoic anhydride and tetrafluoro-o-sulfobenzoic anhydride; chain phosphinic acid anhydrides such as diphenyl phosphinic acid; cyclic phosphonic acid anhydrides such as 1-propanephosphonic anhydride; 3,4-diiodophenylboronic anhydride, 3,4-dibromophenylboronic anhydride, 3,4-dichlorophenylboronic anhydride, 3,4-difluorophenylboronic anhydride, 4-iodophenylboronic anhydride, 4-bromophenylboronic anhydride, 4-chlorophenylboronic anhydride, 4-fluorophenylboronic anhydride, (m-terphenyl)boronic anhydride, 3,4,5-triiodophenylboronic anhydride, 3,4,5-tribromophenylboronic anhydride, 3,4,5-trichlorophenylboronic anhydride, 3,4,5-trifluorophenylboronic anhydride and the like.

The acid anhydride preferably has a cyclic structure, and more preferably further has an unsaturated bond. The acid anhydride is particularly preferably maleic anhydride from the viewpoint that it is easy in availability and has a cyclic structure and an unsaturated bond in its molecule.

The cyclic carbonate having an unsaturated bond in the component (b2) is not particularly limited in its type as long as it does not impair the characteristics of the nonaqueous electrolytic solution of the present embodiment and the secondary battery using the same, and various cyclic carbonates having an unsaturated bond can be selected. The number of the unsaturated bonds is preferably 1 to 10, more preferably 1 to 5, and particularly preferably 1 to 3. Specific examples of the cyclic carbonate having an unsaturated bond include vinylene carbonate, iodovinylene carbonate, bromovinylene carbonate, chlorovinylene carbonate, fluorovinylene carbonate, 1,2-diiodovinylene carbonate, 1,2-dibromovinylene carbonate, 1,2-dichlorovinylene carbonate, 1,2-difluorovinylene carbonate, methyl vinylene carbonate, iodomethyl vinylene carbonate, bromomethyl vinylene carbonate, chloromethyl vinylene carbonate, fluoromethyl vinylene carbonate, dichloromethyl vinylene carbonate, dibromomethyl vinylene carbonate, dichloromethyl vinylene carbonate, difluoromethyl vinylene carbonate, triiodomethyl vinylene carbonate, tribromomethyl vinylene carbonate, trichloromethyl vinylene carbonate, trifluoromethyl vinylene carbonate, ethyl vinylene carbonate, propyl vinylene carbonate, butyl vinylene carbonate, dimethyl vinylene carbonate, diethyl vinylene carbonate, dipropyl vinylene carbonate, vinyl ethylene carbonate and the like.

In addition, of the cyclic carbonates having an unsaturated bond described above, vinylene carbonate is preferred from the viewpoint of ease of availability.

The cyclic carbonate having a halogen atom in the component (b2) is not particularly limited in its type as long as it does not impair the characteristics of the nonaqueous electrolytic solution of the present embodiment and the secondary battery using the same, and various cyclic carbonates having a halogen atom can be selected. Herein, the halogen atom means a fluorine atom, a chlorine atom, a bromine atom or an iodine atom. Specific examples of the cyclic carbonate having a halogen atom include iodoethylene carbonate, bromoethylene carbonate, chloroethylene carbonate, fluoroethylene carbonate, 1,2-diiodoethylene carbonate, 1,2-dibromoethylene carbonate, 1,2-dichloroethylene carbonate, 1,2-difluoroethylene carbonate and the like.

In addition, of the cyclic carbonates having a halogen atom described above, chloroethylene carbonate and fluoroethylene carbonate are preferred from the viewpoint of ease of availability.

The cyclic sulfonic acid ester in the component (b2) is not particularly limited in its type as long as it does not impair the characteristics of the nonaqueous electrolytic solution of the present embodiment and the secondary battery using the same, and various cyclic sulfonic acid esters can be selected. Specific examples of the cyclic sulfonic acid ester include 1,3-propane sultone, 2,4-butane sultone, 1,4-butane sultone, ethylenesulfite and the like.

In addition, of the cyclic sulfonic acid esters described above, 1,3-propane sultone and ethylenesulfite are preferred from the viewpoint of ease of availability.

The amines having an acetoacetyl group in the component (b2) are specifically one represented by the following general formula (3).

[Chemical Formula 6]

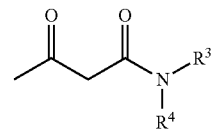

(3)

The $R^3$ and $R^4$ each independently represent any of a hydrocarbon group having 1 to 20 carbon atoms, preferably 1 to 10 carbon atoms and more preferably 1 to 5, and a hydrocarbon group having 1 to 20 carbon atoms, preferably 1 to 10 carbon atoms and more preferably 1 to 5 and having a halogen atom, a heteroatom or an unsaturated bond. Herein, the halogen atom means a fluorine atom, a chlorine atom, a bromine atom or an iodine atom, and the heteroatom means an oxygen atom, a nitrogen atom or a sulfur atom.

Specific examples of the above-mentioned $R^3$ and $R^4$ include chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; halogen-containing chain alkyl groups such as a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a hexafluoro-2-propyl group; halogen-containing cyclic alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and 3-cyclohexenyl group; chain alkynyl groups such as a 2-propynyl group, a 1-butynyl group, a 2-butynyl group, a 3-butynyl group, a 1-pentynyl group, a 2-pentynyl group, a 3-pentynyl group and 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; and naphthyl groups such as a 1-naphthyl group, a 2-naphthyl group and a 3-amino-2-naphthyl group.

The $R^3$ and the $R^4$ may be the same or may be different. A group of the functional groups described above is merely an exemplification, and the present embodiment is not limited to these functional groups.

Specific examples of the compounds represented by the general formula (3) include N,N-dimethylacetoacetamide, N,N-diethylacetoacetamide, N,N-dipropylacetoacetamide, N,N-dibutylacetoacetamide, N,N-ethylmethylacetoacetamide, N,N-methylpropylacetoacetamide and N,N-butylmethylacetoacetamide. However, these compounds are merely an exemplification, and the present embodiment is not limited to these compounds.

An addition amount of the component (B) is preferably in a range of 0.05% by mass to 5% by mass, more preferably in a range of 0.1% by mass to 3% by mass, and particularly preferably in a range of 0.5% by mass to 2% by mass of a total mass of the nonaqueous electrolytic solution. When the addition amount is 0.05% by mass or more, this enables the effect as an additive, that is, formation of a stable coating on the surface of an electrode. On the other hand, when the addition amount is 5% by mass or less, it is possible to suppress lowering of the solubility of an electrolyte of a nonaqueous electrolytic solution in a solvent of a nonaqueous electrolytic solution.

Further, in the present embodiment, with respect to the component (B), at least one type of the component (B) has to be contained in the nonaqueous electrolytic solution; however, the number of types of the component (B) to be contained is 1 to 5, more preferably 1 to 3, and particularly preferably 1 to 2. By reducing the number of types of the component (B), it is possible to reduce the complication of a process step in producing a nonaqueous electrolytic solution.

<Electrolyte>

As the electrolyte, publicly known electrolytes can be employed. For example, a lithium salt is used in the case of lithium ion battery applications, and a sodium salt is used in the case of sodium ion battery applications. Therefore, a type of the electrolyte may be appropriately selected according to the type of the secondary battery.

Further, as the electrolyte, an electrolyte containing an anion containing fluorine is preferred. Specific examples of such fluorine-containing anions include $BF_4^-$, $PF_6^-$, $BF_3CF_3^-$, $BF_3C_2F_5^-$, $CF_3SO_3^-$, $C_2F_5SO_3^-$, $C_3F_7SO_3^-$, $C_4F_9SO_3^-$, $N(SO_2F)_2^-$, $N(CF_3SO_2)_2^-$, $N(C_2F_5SO_2)_2^-$, $N(CF_3SO_2)(CF_3CO)^+$, $N(CF_3SO_2)(C_2F_5SO_2)^-$, $C(CF_3SO_2)_3^-$, and the like. These fluorine-containing anions may be used alone or may be used in combination of two kinds or more thereof. Of the fluorine-containing anions, $BF_4^-$, $PF_6^-$ and $N(CF_3SO_2)_2^-$ are preferred, and $BF_4^-$ and $PF_6^-$ are particularly preferred from the viewpoint of safety/stability of a nonaqueous electrolytic solution and improvement in an electric conductivity and cycle characteristics.

A concentration of the electrolyte in the organic solvent is not particularly limited, and it is usually 0.1 to 2M, preferably 0.15 to 1.8M, more preferably 0.2 to 1.5M, and particularly preferably 0.3 to 1.2M. When the concentration is 0.1M or more, it is possible to prevent the electric conductivity of the nonaqueous electrolytic solution from becoming insufficient. On the other hand, when the concentration is 2M or less, it is possible to suppress the lowering of the electric conductivity due to an increase of viscosity of the nonaqueous electrolytic solution in order to prevent deterioration of secondary battery performance <Organic Solvent>

The organic solvent (nonaqueous solvent) to be used for the nonaqueous electrolytic solution are not particularly limited, and examples thereof include cyclic carbonic acid esters, chain carbonic acid esters, phosphoric acid esters, cyclic ethers, chain ethers, lactone compounds, chain esters, nitrile compounds, amide compounds, sulfone compounds and the like. Among these organic solvents, the carbonic acid ester is preferred in the viewpoint that it is commonly used as an organic solvent for a lithium secondary battery.

The cyclic carbonic acid esters are not particularly limited, and examples thereof include ethylene carbonate, propylene carbonate, butylene carbonate and the like. Among these carbonates, cyclic carbonates such as ethylene carbonate and propylene carbonate are preferred from the viewpoint of improving charge efficiency of a lithium secondary battery. The chain carbonic acid esters are not particularly limited, and examples thereof include dimethyl carbonate, ethyl methyl carbonate, diethyl carbonate and the like. Among these carbonates, dimethyl carbonate and ethyl methyl carbonate are preferred from the viewpoint of improving charge efficiency of a lithium secondary battery. The phosphoric acid esters are not particularly limited, and examples thereof include trimethyl phosphate, triethyl phosphate, ethyl dimethyl phosphate, diethyl methyl phosphate and the like. The cyclic ethers are not particularly limited, and examples thereof include tetrahydrofuran, 2-methyl tetrahydrofuran and the like. The chain ethers are not particularly limited, and examples thereof include dimethoxyethane and the like. The lactone compounds are not particularly limited, and examples thereof include y-butyrolactone and the like. The chain esters are not particularly limited, and examples thereof include methyl propionate, methyl acetate, ethyl acetate, methyl formate and the like. The nitrile compounds are not particularly limited, and examples thereof include acetonitrile and the like. The amide compounds are not particularly limited, and examples thereof include dimethylformamide and the like. The sulfone compounds are not particularly limited, and examples thereof include sulfolane, methylsulfolane and the like. Further, organic solvents obtained by substituting, with fluorine, at least a part of hydrogens of hydrocarbon groups contained in molecules of the aforementioned organic solvents, can be suitably used. These organic solvents may be used alone or may be used as a mixture of two or more thereof.

As the organic solvent, a carbonic acid ester is preferably used from the viewpoint of ease of availability and performance.

<Production of Nonaqueous Electrolytic Solution>

The nonaqueous electrolytic solution of the present embodiment is obtained, for example, by adding a salt of the aforementioned electrolyte to the aforementioned organic solvent (nonaqueous solvent), then adding at least one type of the component (A), and further adding the component (B). In the process of these additions, it is preferred to use the organic solvent, the salt of the electrolyte, the component (A) and the component (B) which are low in impurities as far as possible by previously purifying them within a scope which does not lower production efficiency. In addition, when a plurality of types of compound of the component (A) or the component (B) is used, the order of addition of them can be appropriately set as required. Further, the component (A) and the component (B) can be produced by publicly known methods.

<Others>

Publicly known other additives may be added to the nonaqueous electrolytic solution of the present embodiment.

(Secondary Battery)

A lithium ion secondary battery will be described below as an example of the secondary battery of the present invention. FIG. 1 is a schematic sectional view showing an outline of a lithium ion secondary battery including the nonaqueous electrolytic solution.

The lithium ion secondary battery of the present embodiment has a structure in which a laminated body formed by laminating a positive electrode 1, a separator 3, a negative electrode 2, and a spacer 7 in this order from a side of a positive electrode can 4, is housed in an internal space that the positive electrode can 4 forms with a negative electrode can 5, as shown in FIG. 1. By interposing a spring 8 between the negative electrode can 5 and the spacer 7, the positive electrode 1 and the negative electrode 2 are moderately fixed to each other by pressure. The nonaqueous electrolytic solution containing the component (A) to the component (B) of the present embodiment is impregnated between the positive electrode 1 and the separator 3, and between the separator 3 and the negative electrode 2. The positive electrode can 4 and the negative electrode can 5 are supported by sandwiching a gasket 6 between the positive electrode can 4 and the negative electrode can 5 and joined to each other to hermetically seal the laminated body.

A material of a positive electrode active material layer in the positive electrode 1 is not particularly limited, and examples thereof include transition metal compounds having a structure in which lithium ions can be diffused and oxides of the transition metal compound and lithium. Examples of the specific materials to be used include oxides such as $LiCoO_2$, $LiNiO_2$, $LiMn_2O_4$, $Li_2MnO_3+LiMeO_2$ (Me is Mn, Co or Ni) solid solution, $LiFePO_4$, $LiCoPO_4$, $LiMnPO_4$, $Li_2FePO_4F$, $LiNi_xCo_yMn_zO_2$ ($0 \leq x \leq 1$, $0 \leq y \leq 1$, $0 \leq z \leq 1$, $x+y+z=1$), $LiNi_xCoyAl_zO_2$ ($0 \leq x \leq 1$, $0 \leq y \leq 1$, $0 \leq z \leq 1$, $x+y+z=1$), $LiFeF_3$, $TiO_2$, $V_2O_5$ and $MoO_3$; sulfides such as $TiS_2$ and $FeS$; conductive polymers such as polyacetylene, polyparaphenylene, polyaniline and polypyrrole; an activated carbon; polymers generating radicals; carbon materials; and the like.

The positive electrode 1 can be obtained by molding the positive electrode active material described above by pressure molding together with a conduction aid and a binder which are publicly known, or by mixing a positive electrode active material in an organic solvent such as pyrrolidone together with a conduction aid and a binder which are publicly known to form a paste, applying the paste onto a current collector of an aluminum foil or the like, and drying the paste.

A material of a negative electrode active material layer in the negative electrode 2 is not particularly limited as long as it is a material capable of storing/releasing lithium, and examples thereof include metal composite oxides, lithium metal, lithium alloys, silicon, silicon-based alloys, tin-based alloys, metal oxides, conductive polymers such as polyacetylene, Li—Co—Ni-based materials, carbon materials and the like.

The metal composite oxides are not particularly limited, and examples thereof include $Li_xFe_2O_3$ ($0 \leq x \leq 1$), $Li_xWO_2$ ($0 \leq x \leq 1$), $Sn_xMe^1_{1-x}Me^2_yO_z$ ($Me^1$ is Mn, Fe, Pb or Ge, $Me^2$ is Al, B, P, Si, elements in Groups 1 to 3 of a periodic table or halogens, and $0 < x \leq 1$, $1 \leq y \leq 3$ and $1 \leq z \leq 8$) and the like.

The metal oxides are not particularly limited, and examples thereof include $SnO$, $SnO_2$, $SiO_x$ ($0 < x < 2$), $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$ and the like.

The carbon materials are not particularly limited, and examples thereof include natural graphite, artificial graphite, borated graphite, fluorinated graphite, meso-carbon microbead, graphitize pitch-based carbon fiber, carbon nanotube, hard carbon, fullerene and the like.

For the negative electrode 2, a foil-like electrode material or a powdery electrode material of the aforementioned electrode material can be used. In the case of the powdery electrode material, the negative electrode 2 can be obtained by molding the electrode material by pressure molding together with a conduction aid and a binder which are publicly known, or by mixing the electrode material in an organic solvent such as pyrrolidone together with a conduction aid and a binder which are publicly known to form a paste, applying the paste onto a current collector of a copper foil or the like, and drying the paste.

In the lithium ion secondary battery of the present embodiment, a separator 3 is interposed between the positive electrode 1 and the negative electrode 2 in order to prevent short circuit therebetween. A material or a shape of the separator 3 is not particularly limited; however, the material is preferably a material through which the aforementioned nonaqueous electrolytic solution can easily pass and which is insulating and chemically stable. Examples of such a material include microporous films or sheets made of various polymer materials. As the specific examples of the polymer material, nylon (registered trademark), nitrocellulose, polyacrylonitrile, polyvinylidene fluoride, and polyolefinic polymers, such as polyethylene and polypropylene, are used. The polyolefinic polymers are preferred from the viewpoint of electrochemical stability and chemical stability.

An optimum service voltage of the lithium ion secondary battery of the present embodiment varies among combinations of the positive electrode 1 and the negative electrode 2, and the voltage can be usually used in a range of 2.4 V to 4.6 V.

A shape of the lithium ion secondary battery of the present embodiment is not particularly limited, and examples thereof include a cylindrical shape, a prismatic shape, a laminate shape and the like in addition to a coin shape shown in FIG. 1.

According to the secondary battery of the present embodiment, it is possible to exhibit excellent cycle characteristics even in high-temperature environments, and the nonaqueous electrolytic solution of the present embodiment can be suitably used for, for example, a lithium ion secondary battery. However, the lithium ion secondary battery shown in FIG. 1 is shown as an example of an aspect of the secondary battery of the present invention, and the secondary battery of the present invention is not limited to this example.

EXAMPLES

Suitable examples of the present invention will be described in detail below by way of examples. However, materials or mixing amounts described in these examples do not purport to limit the scope of the present invention only to these unless there is a definitive description.

(Synthesis of Component (A))

<Lithium Diethyl Phosphate>

Into a PFA container, 5 g of lithium dichlorophosphate was charged, and subsequently 16.4 g of ethanol was charged. Thereafter, 8.6 g of triethylamine was added dropwise at room temperature (20° C.) while stirring the resulting mixture. The mixture generates heat a little during dropwise addition, and a white precipitate was found to be precipitated in a system.

Thereafter, the PFA container was cooled to room temperature, and the mixture was stirred for 3 hours. Further, the mixture was filtrated under a reduced pressure to separate the white precipitate from the ethanol solution. Ethanol was distilled off from a filtrate under a reduced pressure to thereby obtain 5.1 g of a white solid. The obtained white solid was subjected to anion analysis using ion chromatography (manufactured by Metrohm AG, trade name; IC-850), and consequently it was identified that the obtained white solid was lithium diethyl phosphate.

Lithium Bis(2,2,2-trifluoroethyl) Phosphate

Into a PFA container, 5 g of lithium dichlorophosphate was charged, and 30 g of dimethoxyethane was further charged. Subsequently, 35.5 g of 2,2,2-trifluoroethanol was charged. Thereafter, 9.0 g of triethylamine was added dropwise at room temperature while stirring the resulting mixture. The mixture generates heat a little during dropwise addition, and a white precipitate was found to be precipitated in a system.

Thereafter, the PFA container was cooled to room temperature, and the mixture was stirred for 3 hours. Further, the mixture was filtrated under a reduced pressure to separate the white precipitate from a mixed solution of dimethoxyethane and 2,2,2-trifluoroethanol. Dimethoxyethane and 2,2,2-trifluoroethanol were distilled off from a filtrate under a reduced pressure to thereby obtain 5.1 g of a white solid. The obtained white solid was subjected to anion analysis using ion chromatography (manufactured by Metrohm AG, trade name; IC-850), and consequently it was identified that the obtained white solid was lithium bis(2,2,2-trifluoroethyl) phosphate.

Example 1

<Preparation of Nonaqueous Electrolytic Solution>
A nonaqueous electrolytic solution was prepared in a dry box of an argon atmosphere having a dew point of −70° C. or lower so that a concentration of $LiPF_6$ was 1.0 mol/liter in a mixed solvent of ethylene carbonate (EC) and dimethyl carbonate (DMC) (A volume ratio between EC and DMC is 1:1, produced by KISHIDA CHEMICAL Co., Ltd., lithium battery grade).

Then, to the mixed solvent, the lithium diethyl phosphate and triethylmethylammonium bis(oxalato)borate were added so as to be 0.5% by mass and 1.0% by mass, respectively, in concentration. Thereby, a nonaqueous electrolytic solution of the present example was prepared.

Example 2

In the present example, a nonaqueous electrolytic solution was prepared in the same manner as in Example 1 except that maleic anhydride was added so as to be 0.5% by mass in concentration in place of triethylmethylammonium bis(oxalato)borate.

Example 3

In the present example, a nonaqueous electrolytic solution was prepared in the same manner as in Example 1 except that propane sultone was added so as to be 0.5% by mass in concentration in place of triethylmethylammonium bis(oxalato)borate.

Example 4

In the present example, a nonaqueous electrolytic solution was prepared in the same manner as in Example 1 except that vinylene carbonate was added so as to be 0.5% by mass in concentration in place of triethylmethylammonium bis(oxalato)borate.

Example 5

In the present example, a nonaqueous electrolytic solution was prepared in the same manner as in Example 1 except that lithium bis(salicylato)borate was added so as to be 0.5% by mass in concentration in place of triethylmethylammonium bis(oxalato)borate.

Example 6

In the present example, a nonaqueous electrolytic solution was prepared in the same manner as in Example 1 except that lithium bis[1,2'-benzenediolato(2)-O,O']borate was added so as to be 0.5% by mass in concentration in place of triethylmethylammonium bis(oxalato)borate.

Example 7

In the present example, a nonaqueous electrolytic solution was prepared in the same manner as in Example 1 except that trimethyl borate was added so as to be 0.5% by mass in concentration in place of triethylmethylammonium bis(oxalato)borate.

Example 8

In the present example, a nonaqueous electrolytic solution was prepared in the same manner as in Example 1 except that fluoroethylene carbonate was added so as to be 0.5% by mass in concentration in place of triethylmethylammonium bis(oxalato)borate.

Example 9

In the present example, a nonaqueous electrolytic solution was prepared in the same manner as in Example 1 except that N,N-dimethylacetoacetamide was added so as to be 0.5% by mass in concentration in place of triethylmethylammonium bis(oxalato)borate.

Example 10

In the present example, a nonaqueous electrolytic solution was prepared in the same manner as in Example 1 except that lithium difluorooxalatoborate was added so as to be 0.5% by mass in concentration in place of triethylmethylammonium bis(oxalato)borate.

Example 11

In the present example, a nonaqueous electrolytic solution was prepared in the same manner as in Example 1 except that triethylmethylammonium bis(oxalato)borate was added so as to be 0.05% by mass in concentration.

Example 12

In the present example, a nonaqueous electrolytic solution was prepared in the same manner as in Example 1 except that triethylmethylammonium bis(oxalato)borate was added so as to be 3% by mass in concentration.

Example 13

In the present example, a nonaqueous electrolytic solution was prepared in the same manner as in Example 1 except that lithium diethyl phosphate was added so as to be 0.05% by mass in concentration.

Example 14

In the present example, a nonaqueous electrolytic solution was prepared in the same manner as in Example 1 except that lithium diethyl phosphate was added so as to be 3% by mass in concentration.

Example 15

In the present example, a nonaqueous electrolytic solution was prepared in the same manner as in Example 1 except that lithium diethyl phosphate was added so as to be 0.05% by mass in concentration, and triethylmethylammonium bis(oxalato)borate was added so as to be 0.05% by mass in concentration.

Example 16

In the present example, a nonaqueous electrolytic solution was prepared in the same manner as in Example 1 except that lithium diethyl phosphate was added so as to be 3% by mass in concentration, and triethylmethylammonium bis(oxalato)borate was added so as to be 3% by mass in concentration.

Example 17

In the present example, a nonaqueous electrolytic solution was prepared in the same manner as in Example 1 except that lithium bis(2,2,2-trifluoroethyl) phosphate was added in place of lithium diethyl phosphate.

Example 18

In the present example, a nonaqueous electrolytic solution was prepared in the same manner as in Example 1 except that lithium bis(2,2,2-trifluoroethyl) phosphate was added in place of lithium diethyl phosphate, and maleic anhydride was added so as to be 0.5% by mass in concentration in place of triethylmethylammonium bis(oxalato)borate.

Example 19

In the present example, a nonaqueous electrolytic solution was prepared in the same manner as in Example 1 except that lithium bis(2,2,2-trifluoroethyl) phosphate was added in place of lithium diethyl phosphate, and propane sultone was added so as to be 0.5% by mass in concentration in place of triethylmethylammonium bis(oxalato)borate.

Example 20

In the present example, a nonaqueous electrolytic solution was prepared in the same manner as in Example 1 except that lithium bis(2,2,2-trifluoroethyl) phosphate was added in place of lithium diethyl phosphate, and trimethyl borate was added so as to be 0.5% by mass in concentration in place of triethylmethylammonium bis(oxalato)borate.

Example 21

In the present example, a nonaqueous electrolytic solution was prepared in the same manner as in Example 1 except that lithium bis(2,2,2-trifluoroethyl) phosphate was added in place of lithium diethyl phosphate, and N,N-dimethylacetoacetamide was added so as to be 0.5% by mass in concentration in place of triethylmethylammonium bis(oxalato)borate.

Example 22

In the present example, a nonaqueous electrolytic solution was prepared in the same manner as in Example 1 except that lithium bis(2,2,2-trifluoroethyl) phosphate was added in place of lithium diethyl phosphate, and vinylene carbonate was added so as to be 0.5% by mass in concentration in place of triethylmethylammonium bis(oxalato)borate.

Example 23

In the present example, a nonaqueous electrolytic solution was prepared in the same manner as in Example 1 except that lithium bis(2,2,2-trifluoroethyl) phosphate was added in place of lithium diethyl phosphate, and fluoroethylene carbonate was added so as to be 0.5% by mass in concentration in place of triethylmethylammonium bis(oxalato)borate.

Comparative Example 1

In the present comparative example, a nonaqueous electrolytic solution was prepared in the same manner as in Example 1 except that lithium diethyl phosphate and triethylmethylammonium bis(oxalato)borate were not added.

Comparative Example 2

In the present comparative example, a nonaqueous electrolytic solution was prepared in the same manner as in Example 1 except that triethylmethylammonium bis(oxalato)borate was not added.

Comparative Example 3

In the present comparative example, a nonaqueous electrolytic solution was prepared in the same manner as in Example 1 except that lithium bis(2,2,2-trifluoroethyl) phosphate was added in place of lithium diethyl phosphate, and triethylmethylammonium bis(oxalato)borate was not added.

Comparative Example 4

In the present comparative example, a nonaqueous electrolytic solution was prepared in the same manner as in Example 1 except that lithium diethyl phosphate was not added.

Comparative Example 5

In the present comparative example, a nonaqueous electrolytic solution was prepared in the same manner as in Example 1 except that maleic anhydride was added so as to be 0.5% by mass in concentration in place of triethylmethylammonium bis(oxalato)borate, and lithium diethyl phosphate was not added.

Comparative Example 6

In the present comparative example, a nonaqueous electrolytic solution was prepared in the same manner as in Example 1 except that propane sultone was added so as to be 0.5% by mass in concentration in place of triethylmethylammonium bis(oxalato)borate, and lithium diethyl phosphate was not added.

Comparative Example 7

In the present comparative example, a nonaqueous electrolytic solution was prepared in the same manner as in Example 1 except that vinylene carbonate was added so as to be 0.5% by mass in concentration in place of triethylmethylammonium bis(oxalato)borate, and lithium diethyl phosphate was not added.

Comparative Example 8

In the present comparative example, a nonaqueous electrolytic solution was prepared in the same manner as in Example 1 except that fluoroethylene carbonate was added so as to be 0.5% by mass in concentration in place of triethylmethylammonium bis(oxalato)borate, and lithium diethyl phosphate was not added.

Comparative Example 9

In the present comparative example, a nonaqueous electrolytic solution was prepared in the same manner as in Example 1 except that trimethyl borate was added so as to be 0.5% by mass in concentration in place of triethylmethylammonium bis(oxalato)borate, and lithium diethyl phosphate was not added.

Comparative Example 10

In the present comparative example, a nonaqueous electrolytic solution was prepared in the same manner as in Example 1 except that N,N-dimethylacetoacetamide was added so as to be 0.5% by mass in concentration in place of triethylmethylammonium bis(oxalato)borate, and lithium diethyl phosphate was not added.

Comparative Example 11

In the present comparative example, a nonaqueous electrolytic solution was prepared in the same manner as in Example 1 except that lithium bis(salicylato)borate was added so as to be 0.5% by mass in concentration in place of triethylmethylammonium bis(oxalato)borate, and lithium diethyl phosphate was not added.

Comparative Example 12

In the present comparative example, a nonaqueous electrolytic solution was prepared in the same manner as in Example 1 except that lithium bis[1,2'-benzenediolato(2)-O,O']borate was added so as to be 0.5% by mass in concentration in place of triethylmethylammonium bis(oxalato)borate, and lithium diethyl phosphate was not added.

Comparative Example 13

In the present comparative example, a nonaqueous electrolytic solution was prepared in the same manner as in Example 1 except that lithium difluorooxalatoborate was added so as to be 0.5% by mass in concentration in place of triethylmethylammonium bis(oxalato)borate, and lithium diethyl phosphate was not added.

(Evaluation of Cycle Characteristics)
<Preparation of Coin Cell>
A coin type lithium secondary battery as shown in FIG. 1 was prepared, and electrochemical characteristics of the nonaqueous electrolytic solution of Examples and Comparative Example were evaluated.

That is, $LiNi_{1/3}Co_{1/3}Mn_{1/3}O_2$ (produced by Piotrek Co., Ltd.), cut out into a piece of 9 mm in diameter, was used for the positive electrode, a polyethylene separator was used for the separator, and a natural graphite sheet (produced by Piotrek Co., Ltd.), cut out into a piece of 10 mm in diameter, was used for the negative electrode. Furthermore, the positive electrode, the separator, and the negative electrode were laminated in this order to form a laminated body, and the laminated body was impregnated with the nonaqueous electrolytic solution prepared in each of Examples and Comparative Examples and hermetically sealed to prepare a coin cell of each of Examples and Comparative Examples. Assembling of the coin cells was all performed in a glove box of an argon atmosphere having a dew point of −70° C. or lower.

<Aging Charge-Discharge>
The prepared coin cell was charged and discharged by 5 cycles in the conditions of end-of-charge voltage of 4.2 V and end-of-discharge voltage of 3.0 V by a constant current constant voltage method of 0.2 C (a current value at which a rated capacity is charged or discharged in 1 hour is defined as 1 C) in an isothermal bath at 25° C.

<Evaluation of High-temperature Cycle Characteristics>
The coin cell which had undergone aging charge-discharge was charged and discharged by 50 cycles in the conditions of end-of-charge voltage of 4.2 V and end-of-discharge voltage of 3.0 V by a constant current constant voltage method of 0.2 C in an isothermal bath at 60° C. A discharge capacity after 50 cycles was compared and evaluated. In the following Tables 1 to 3, relative discharge capacities of Examples 1 to 23 and Comparative Examples 2 to 13 at the time of assuming that a discharge capacity of Comparative Example 1 is 100, are shown.

TABLE 1

| | Nonaqueous electrolyte solution | | | Relative discharge capacity after 50 cycles at 60° C. |
|---|---|---|---|---|
| | Electrolyte | | Additive | |
| Example 1 | $LiPF_6$ | lithium diethyl phosphate | triethylmethylammonium bis(oxalato)borate | 135 |
| Example 2 | $LiPF_6$ | lithium diethyl phosphate | maleic anhydride | 150 |
| Example 3 | $LiPF_6$ | lithium diethyl phosphate | propane sultone | 137 |
| Example 4 | $LiPF_6$ | lithium diethyl phosphate | vinylene carbonate | 137 |
| Example 5 | $LiPF_6$ | lithium diethyl phosphate | lithium bis(salicylato)borate | 151 |
| Example 6 | $LiPF_6$ | lithium diethyl phosphate | lithium bis[1,2'-benzenediolato(2)-O,O'] borate | 135 |
| Example 7 | $LiPF_6$ | lithium diethyl phosphate | trimethyl borate | 130 |
| Example 8 | $LiPF_6$ | lithium diethyl phosphate | fluoroethylene carbonate | 137 |
| Example 9 | $LiPF_6$ | lithium diethyl phosphate | N,N-dimethylacetoacetamide | 130 |

TABLE 1-continued

|  | Nonaqueous electrolyte solution | | Relative discharge capacity after 50 cycles at 60° C. |
|---|---|---|---|
|  | Electrolyte | Additive |  |
| Example 10 | LiPF$_6$ | lithium diethyl phosphate | lithium difluorooxalatoborate | 135 |
| Example 11 | LiPF$_6$ | lithium diethyl phosphate | triethylmethylammonium bis(oxalato)borate | 120 |

TABLE 2

|  | Nonaqueous electrolyte solution | | Relative discharge capacity after 50 cycles at 60° C. |
|---|---|---|---|
|  | Electrolyte | Additive |  |
| Example 12 | LiPF$_6$ | lithium diethyl phosphate | triethylmethylammonium bis(oxalato)borate | 130 |
| Example 13 | LiPF$_6$ | lithium diethyl phosphate | triethylmethylammonium bis(oxalato)borate | 130 |
| Example 14 | LiPF$_6$ | lithium diethyl phosphate | triethylmethylammonium bis(oxalato)borate | 125 |
| Example 15 | LiPF$_6$ | lithium diethyl phosphate | triethylmethylammonium bis(oxalato)borate | 120 |
| Example 16 | LiPF$_6$ | lithium diethyl phosphate | triethylmethylammonium bis(oxalato)borate | 122 |
| Example 17 | LiPF$_6$ | lithium bis(2,2,2-trifluoro-ethyl)phosphate | triethylmethylammonium bis(oxalato)borate | 137 |
| Example 18 | LiPF$_6$ | lithium bis(2,2,2-trifluoro-ethyl)phosphate | maleic anhydride | 137 |
| Example 19 | LiPF$_6$ | lithium bis(2,2,2-trifluoro-ethyl)phosphate | propane sultone | 135 |
| Example 20 | LiPF$_6$ | lithium bis(2,2,2-trifluoro-ethyl)phosphate | trimethyl borate | 130 |
| Example 21 | LiPF$_6$ | lithium bis(2,2,2-trifluoro-ethyl)phosphate | N,N-dimethylacetoacetamide | 130 |
| Example 22 | LiPF$_6$ | lithium bis(2,2,2-trifluoro-ethyl)phosphate | vinylene carbonate | 147 |
| Example 23 | LiPF$_6$ | lithium bis(2,2,2-trifluoro-ethyl)phosphate | fluoroethylene carbonate | 147 |

TABLE 3

|  | Nonaqueous electrolyte solution | | Relative discharge capacity after 50 cycles at 60° C. |
|---|---|---|---|
|  | Electrolyte | Additive |  |
| Comparative Example 1 | LiPF$_6$ | — | — | 100 |
| Comparative Example 2 | LiPF$_6$ | lithium diethyl phosphate | — | 116 |
| Comparative Example 3 | LiPF$_6$ | lithium bis(2,2,2-trifluoro-ethyl) phosphate | — | 118 |
| Comparative Example 4 | LiPF$_6$ | — | triethylmethylammonium bis(oxalato)borate | 113 |
| Comparative Example 5 | LiPF$_6$ | — | maleic anhydride | 110 |
| Comparative Example 6 | LiPF$_6$ | — | propane sultone | 117 |
| Comparative Example 7 | LiPF$_6$ | — | vinylene carbonate | 116 |
| Comparative Example 8 | LiPF$_6$ | — | fluoroethylene carbonate | 116 |
| Comparative Example 9 | LiPF$_6$ | — | trimethyl borate | 110 |
| Comparative Example 10 | LiPF$_6$ | — | N,N-dimethylacetoacetamide | 110 |
| Comparative Example 11 | LiPF$_6$ | — | lithium bis(salicylato)borate | 118 |

TABLE 3-continued

| | Nonaqueous electrolyte solution | | Relative discharge capacity after 50 cycles at 60° C. |
|---|---|---|---|
| | Electrolyte | Additive | |
| Comparative Example 12 | LiPF$_6$ | lithium bis[1,2'-benzene-diolato(2)-O,O']borate | 118 |
| Comparative Example 13 | LiPF$_6$ | lithium difluorooxalatoborate | 116 |

As is apparent from Tables 1 to 3, the coin cell using each of the nonaqueous electrolytic solutions of Examples 1 to 23 has a higher capacity retention ratio than the coin cell using each of the nonaqueous electrolytic solutions of Comparative Examples 1 to 13 even in high-temperature environments of 60° C., and therefore it was verified that the coin cell using each of the nonaqueous electrolytic solutions of Examples 1 to 23 has excellent cycle characteristics.

DESCRIPTION OF REFERENCE SIGNS

1 Positive electrode
2 Negative electrode
3 Separator
4 Positive electrode can
5 Negative electrode can
6 Gasket
7 Spacer

What is claimed is:
1. A nonaqueous electrolytic solution for a secondary battery which comprises a non-aqueous solvent and an electrolyte,
wherein the non-aqueous electrolyte solution for the secondary battery
comprises:
a following component (A) and a following component (B) that are different from the non-aqueous solvent and the electrolyte,
an addition amount of the component (A) is 0.05% by mass to 5% by mass of a total mass of the nonaqueous electrolytic solution for the secondary battery, and
an addition amount of the component (B) is 0.05% by mass to 5% by mass of the total mass of the nonaqueous electrolytic solution for the secondary battery,
component (A): at least one compound represented by a following general formula (1); and
component (B): one boron complex salt represented by a following general formula (2), or
at least one type of compound selected from the group consisting of boric acid esters, acid anhydrides, cyclic carbonates having an unsaturated bond, cyclic carbonates having a halogen atom, cyclic sulfonic acid esters, and amides represented by a general formula (3) and having an acetoacetyl group:

[Chemical Formula 1]

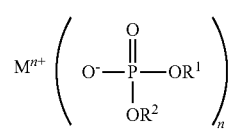
(1)

in which the M$^{n+}$ represents an alkali metal ion, an alkaline earth metal ion, an aluminum ion, a transition metal ion or an onium ion, the R$^1$ and R$^2$ each independently represent any of a hydrocarbon group having 1 to 20 carbon atoms and a hydrocarbon group having 1 to 20 carbon atoms and having at least any one of a halogen atom, and a heteroatom, or the R$^1$ and R$^2$ represent any of a hydrocarbon group having 1 to 20 carbon atoms and a hydrocarbon group having 1 to 20 carbon atoms and having at least any one of a halogen atom, and a heteroatom, and are coupled to each other to form a cyclic structure, and the n represents a valence,

[Chemical Formula 2]

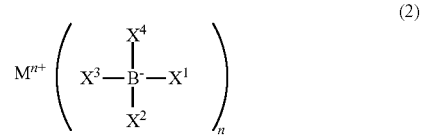
(2)

in which the M$^{n+}$ represents an alkali metal ion, an alkaline earth metal ion, an aluminum ion, a transition metal ion or an onium ion, the X$^1$ to X$^4$ are each independent and one or a combination of two optionally selected from the X$^1$ to X$^4$ form a cyclic structure of —OOC—Y—COO—, —O—Y—O— or —OOC—Y—O— in which the Y represents a hydrocarbon group having 0 to 20 carbon atoms or a hydrocarbon group having 0 to 20 carbon atoms and having a heteroatom, an unsaturated bond or a cyclic structure, or the X$^1$ to X$^4$ each independently represent a halogen atom, an alkyl group having 0 to 20 carbon atoms, an alkoxy group having 0 to 20 carbon atoms, an alkyl group having 0 to 20 carbon atoms and having at least any one of a halogen atom, a heteroatom and an unsaturated bond, or an alkoxy group having 0 to 20 carbon atoms and having at least any one of a halogen atom, a heteroatom and an unsaturated bond, and the n represents a valence and with the proviso that compound of formula (2) is not lithium bis(oxalato)borate,

[Chemical Formula 3]

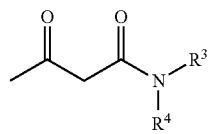
(3)

in which the R³ and R⁴ each independently represent any of a hydrocarbon group having 1 to 20 carbon atoms and a hydrocarbon group having 1 to 20 carbon atoms and having a halogen atom, a heteroatom or an unsaturated bond.

2. The nonaqueous electrolytic solution for a secondary battery according to claim 1, wherein the component (A) is either lithium diethyl phosphate or lithium bis(2,2,2-trifluoroethyl)phosphate.

3. The nonaqueous electrolytic solution for a secondary battery according to claim 1, wherein the boron complex salt represented by the general formula (2) is triethylmethylammonium bis(oxalato)borate, lithium bis(salicylato)borate or lithium bis[1,2'-benzenediolato(2)-O,O']borate.

4. The nonaqueous electrolytic solution for a secondary battery according to claim 1, wherein trimethyl borate is used as the boric acid esters.

5. The nonaqueous electrolytic solution for a secondary battery according to claim 1, wherein a maleic anhydride is used as the acid anhydrides.

6. The nonaqueous electrolytic solution for a secondary battery according to claim 1, wherein vinylene carbonate is used as the cyclic carbonates having an unsaturated bond.

7. The nonaqueous electrolytic solution for a secondary battery according to claim 1, wherein fluoroethylene carbonate is used as the cyclic carbonates having a halogen atom.

8. The nonaqueous electrolytic solution for a secondary battery according to claim 1, wherein propane sultone is used as the cyclic sulfonic acid esters.

9. The nonaqueous electrolytic solution for a secondary battery according to claim 1, wherein N,N-dimethylacetoacetamide is used as the amines represented by the general formula (3) and having an acetoacetyl group.

10. A secondary battery including at least the nonaqueous electrolytic solution for a secondary battery according to claim 1, a positive electrode and a negative electrode.

* * * * *